(12) United States Patent
Burdis et al.

(10) Patent No.: US 11,567,383 B2
(45) Date of Patent: *Jan. 31, 2023

(54) ELECTROCHROMIC DEVICES AND METHODS

(71) Applicant: SAGE ELECTROCHROMICS, INC., Fairbault, MN (US)

(72) Inventors: Mark Samuel Burdis, Faribault, MN (US); Douglas Glenn John Weir, Northfield, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 1316 days.

This patent is subject to a terminal disclaimer.

(21) Appl. No.: 15/963,274

(22) Filed: Apr. 26, 2018

(65) Prior Publication Data

US 2018/0348589 A1 Dec. 6, 2018

Related U.S. Application Data

(60) Continuation of application No. 13/895,680, filed on May 16, 2013, now Pat. No. 10,061,174, which is a (Continued)

(51) Int. Cl.
*G02F 1/15* (2019.01)
*G02F 1/1524* (2019.01)
*G02F 1/155* (2006.01)

(52) U.S. Cl.
CPC ............ *G02F 1/1524* (2019.01); *G02F 1/155* (2013.01); *G02F 2001/1502* (2013.01)

(58) Field of Classification Search
CPC . G02F 1/1524; G02F 1/155; G02F 2001/1502
(Continued)

(56) References Cited

U.S. PATENT DOCUMENTS 2,281,474 A 4/1942 Cartwright et al.
2,429,420 A 10/1947 McMaster
(Continued)

FOREIGN PATENT DOCUMENTS

CA 2006179 A1 6/1990
EP 0071865 B1 10/1985
(Continued)

OTHER PUBLICATIONS

Granqvist, C.G. et al., "Electrochromic Coatings and Devices: Survey of Some Recent Advances," Thin Solid Films, Elsevier B.V., vol. 442, dated 2003, pp. 201-211.
(Continued)

*Primary Examiner* — Rodney G McDonald
(74) *Attorney, Agent, or Firm* — Abel Schillinger, LLP; Robert N Young

(57) ABSTRACT

A heat treated electrochromic device comprising an anodic complementary counter electrode layer comprised of a mixed tungsten-nickel oxide and lithium, which provides a high transmission in the fully intercalated state and which is capable of long term stability, is disclosed. Methods of making an electrochromic device comprising an anodic complementary counter electrode comprised of a mixed tungsten-nickel oxide are also disclosed.

18 Claims, 2 Drawing Sheets

Related U.S. Application Data continuation of application No. 12/077,324, filed on Mar. 19, 2008, now Pat. No. 9,581,875, which is a division of application No. 11/359,664, filed on Feb. 22, 2006, now Pat. No. 7,372,610.

(60) Provisional application No. 60/655,578, filed on Feb. 23, 2005.

(58) Field of Classification Search
USPC .......................................................... 359/265
See application file for complete search history.

(56) References Cited

U.S. PATENT DOCUMENTS

| | | |
|---|---|---|
| 2,478,385 A | 8/1949 | Gaiser |
| 2,549,596 A | 4/1951 | Hamilton et al. |
| 3,176,574 A | 4/1965 | Socha |
| 3,205,564 A | 9/1965 | Shaw et al. |
| 3,317,266 A | 5/1967 | Heller et al. |
| 3,378,396 A | 4/1968 | Zaromb |
| 3,668,758 A | 6/1972 | Krock et al. |
| 3,736,047 A | 5/1973 | Gelber et al. |
| 3,756,789 A | 9/1973 | Alder et al. |
| 3,892,472 A | 7/1975 | Giglia |
| 3,995,940 A | 12/1976 | Guyon et al. |
| 4,046,659 A | 9/1977 | Cormia et al. |
| 4,053,209 A | 10/1977 | Hara et al. |
| 4,146,657 A | 3/1979 | Gordon |
| 4,153,345 A | 5/1979 | Duchene et al. |
| 4,162,202 A | 7/1979 | Dey |
| 4,174,152 A | 11/1979 | Giglia et al. |
| 4,187,336 A | 2/1980 | Gordon |
| 4,206,252 A | 6/1980 | Gordon |
| 4,265,974 A | 5/1981 | Gordon |
| 4,278,329 A | 7/1981 | Matsuhiro et al. |
| 4,282,272 A | 8/1981 | Matsuhiro et al. |
| 4,303,310 A | 12/1981 | Morita et al. |
| 4,325,611 A | 4/1982 | Huggins et al. |
| 4,333,983 A | 6/1982 | Allen |
| 4,338,000 A | 7/1982 | Kamimor et al. |
| 4,344,674 A | 8/1982 | Giglia |
| 4,346,964 A | 8/1982 | Ishihama et al. |
| 4,348,077 A | 9/1982 | Kondo et al. |
| 4,348,078 A | 9/1982 | McIntyre |
| 4,350,414 A | 9/1982 | Takahashi et al. |
| 4,377,613 A | 3/1983 | Gordon |
| 4,386,117 A | 5/1983 | Gordon |
| 4,389,534 A | 6/1983 | Winterling |
| 4,414,176 A | 11/1983 | Krauss et al. |
| 4,416,517 A | 11/1983 | Beall et al. |
| 4,419,386 A | 12/1983 | Gordon |
| 4,440,822 A | 4/1984 | Gordon |
| 4,447,133 A | 5/1984 | Miyoshi |
| 4,451,498 A | 5/1984 | Hashimoto et al. |
| 4,465,339 A | 8/1984 | Baucke et al. |
| RE31,708 E | 10/1984 | Gordon |
| 4,485,416 A | 11/1984 | Walters |
| 4,486,487 A | 12/1984 | Skarp |
| 4,507,547 A | 3/1985 | Taga et al. |
| 4,528,418 A | 7/1985 | McGill |
| 4,550,982 A | 11/1985 | Hirai |
| 4,557,819 A | 12/1985 | Meacham et al. |
| 4,573,768 A | 3/1986 | Polak et al. |
| 4,582,764 A | 4/1986 | Allerd et al. |
| 4,583,815 A | 4/1986 | Taga et al. |
| 4,587,038 A | 5/1986 | Tamura |
| 4,595,634 A | 6/1986 | Gordon |
| 4,612,217 A | 9/1986 | Gordon |
| 4,618,218 A | 10/1986 | Shaw et al. |
| 4,712,879 A | 12/1987 | Lynam et al. |
| 4,715,686 A | 12/1987 | Iwashita et al. |
| 4,793,695 A | 12/1988 | Wada et al. |
| 4,810,063 A | 3/1989 | Fergason |
| 4,818,070 A | 4/1989 | Gunjima et al. |
| 4,824,744 A | 4/1989 | Kuo et al. |
| 4,828,880 A | 5/1989 | Jenkins et al. |
| 4,832,463 A | 5/1989 | Goldner et al. |
| 4,895,432 A | 1/1990 | Iwashita et al. |
| 4,916,470 A | 4/1990 | Kovacs et al. |
| 4,923,289 A | 5/1990 | Demiryont |
| 4,938,571 A | 7/1990 | Cogan et al. |
| 4,941,302 A | 7/1990 | Barry |
| 4,960,324 A | 10/1990 | Brown |
| 4,964,701 A | 10/1990 | Dorschner et al. |
| 5,019,420 A | 5/1991 | Rauh |
| 5,067,781 A | 11/1991 | Montanari et al. |
| 5,076,673 A | 12/1991 | Lynam et al. |
| 5,076,674 A | 12/1991 | Lynam |
| 5,080,471 A | 1/1992 | Cogan et al. |
| 5,110,637 A | 5/1992 | Ando et al. |
| 5,124,832 A | 6/1992 | Greenberg et al. |
| 5,164,855 A | 11/1992 | Buffat et al. |
| 5,165,972 A | 11/1992 | Porter |
| 5,168,003 A | 12/1992 | Proscia |
| 5,171,413 A | 12/1992 | Arntz et al. |
| 5,202,787 A | 4/1993 | Byker et al. |
| 5,202,788 A | 4/1993 | Weppner |
| 5,230,459 A | 7/1993 | Mueller et al. |
| 5,239,405 A | 8/1993 | Varaprasad et al. |
| 5,253,109 A | 10/1993 | O'Farrell et al. |
| 5,256,485 A | 10/1993 | Terneu et al. |
| 5,260,821 A | 11/1993 | Chu et al. |
| RE34,469 E | 12/1993 | Cogan et al. |
| 5,277,986 A | 1/1994 | Cronon et al. |
| 5,288,381 A | 2/1994 | Cogan et al. |
| 5,288,433 A | 2/1994 | Stevens |
| 5,303,139 A | 4/1994 | Mark |
| 5,307,201 A | 4/1994 | Passerini et al. |
| 5,321,544 A | 6/1994 | Parkhe et al. |
| 5,352,504 A | 10/1994 | Boulanger et al. |
| 5,370,775 A | 12/1994 | Parkhe |
| 5,379,146 A | 1/1995 | Defendini |
| 5,393,563 A | 2/1995 | Ellis, Jr. |
| 5,394,264 A | 2/1995 | Marchese et al. |
| 5,399,435 A | 3/1995 | Ando et al. |
| 5,401,305 A | 3/1995 | Russo et al. |
| 5,413,739 A | 5/1995 | Coleman |
| 5,416,617 A | 5/1995 | Loiseaux et al. |
| 5,427,669 A | 6/1995 | Drummond |
| 5,501,744 A | 3/1996 | Albright et al. |
| 5,507,897 A | 4/1996 | Campet et al. |
| 5,522,976 A | 6/1996 | Campet et al. |
| 5,525,264 A | 6/1996 | Cronin et al. |
| 5,584,974 A | 12/1996 | Sellers |
| 5,605,609 A | 2/1997 | Ando et al. |
| 5,651,865 A | 7/1997 | Sellers |
| 5,657,150 A | 8/1997 | Kallman et al. |
| 5,668,663 A | 9/1997 | Varaprasad et al. |
| 5,699,192 A | 12/1997 | Van Dine et al. |
| 5,706,022 A | 1/1998 | Hato |
| 5,718,813 A | 2/1998 | Drummond et al. |
| 5,721,633 A | 2/1998 | Nagal et al. |
| 5,724,175 A | 3/1998 | Hichwa et al. |
| 5,724,177 A | 3/1998 | Ellis, Jr. et al. |
| 5,724,187 A | 3/1998 | Varaprasad et al. |
| 5,744,537 A | 4/1998 | Brunsvold et al. |
| 5,808,715 A | 9/1998 | Tsai et al. |
| 5,828,432 A | 10/1998 | Shashidhar et al. |
| 5,830,336 A | 11/1998 | Schulz |
| 5,859,722 A | 1/1999 | Suga et al. |
| 5,859,723 A | 1/1999 | Jodicke et al. |
| 5,865,865 A | 2/1999 | Yoshida et al. |
| 5,919,571 A | 7/1999 | Badding et al. |
| 5,959,762 A | 9/1999 | Bandettini et al. |
| 5,985,486 A | 11/1999 | Giron |
| 6,039,850 A | 3/2000 | Schulz |
| 6,094,292 A | 7/2000 | Goldner et al. |
| 6,115,171 A | 9/2000 | Minami et al. |
| 6,157,479 A | 12/2000 | Heuer et al. |
| 6,178,034 B1 | 1/2001 | Allemand et al. |
| 6,184,960 B1 | 2/2001 | Sawayama et al. |
| 6,194,650 B1 | 2/2001 | Wakayama et al. |
| 6,211,995 B1 | 4/2001 | Azens et al. |

(56) References Cited

U.S. PATENT DOCUMENTS

| | | | |
|---|---|---|---|
| 6,266,177 B1 | 7/2001 | Allemand et al. | |
| 6,277,523 B1 | 8/2001 | Giron | |
| 6,301,038 B1 | 10/2001 | Fitzmaurice et al. | |
| 6,310,674 B1 | 10/2001 | Suzuki et al. | |
| 6,323,988 B1 | 11/2001 | Heuer et al. | |
| 6,337,758 B1 | 1/2002 | Beteille et al. | |
| 6,369,934 B1 | 4/2002 | Bechinger et al. | |
| 6,388,301 B1 | 5/2002 | Tawada et al. | |
| 6,403,741 B1 | 6/2002 | Heuer et al. | |
| 6,466,298 B1 | 10/2002 | Fix et al. | |
| 6,496,295 B1 | 12/2002 | Wittwer et al. | |
| 6,515,787 B1 | 2/2003 | Westfall et al. | |
| 6,600,473 B1 | 7/2003 | Kobayashi et al. | |
| 6,603,085 B2 | 8/2003 | Oya et al. | |
| 6,620,342 B1 | 9/2003 | Burchill et al. | |
| 6,639,708 B2 | 10/2003 | Elkadi et al. | |
| 6,723,566 B2 | 4/2004 | Lee et al. | |
| 6,743,488 B2 | 6/2004 | Memarian et al. | |
| 6,753,047 B1 | 6/2004 | Athey | |
| 6,768,574 B2 | 7/2004 | Bertran Serra et al. | |
| 6,777,699 B1 | 8/2004 | Miley | |
| 6,859,297 B2 | 2/2005 | Lee et al. | |
| 6,952,299 B1 | 10/2005 | Fukazawa et al. | |
| 7,060,320 B1 | 6/2006 | Omote et al. | |
| 7,193,763 B2 | 3/2007 | Beteille et al. | |
| 7,250,326 B2 | 7/2007 | Kaneko et al. | |
| 7,372,610 B2 * | 5/2008 | Burdis | G02F 1/1524 359/265 |
| 7,604,717 B2 | 10/2009 | Beteille et al. | |
| 10,061,174 B2 * | 8/2018 | Burdis | G02F 1/155 |
| 2001/0028217 A1 | 10/2001 | Kataoka et al. | |
| 2001/0031403 A1 | 10/2001 | Giron | |
| 2002/0061718 A1 | 5/2002 | Treichel et al. | |
| 2003/0031928 A1 | 2/2003 | Beteille et al. | |
| 2003/0054730 A1 | 3/2003 | Treichel et al. | |
| 2004/0150867 A1 | 8/2004 | Lee et al. | |
| 2004/0155263 A1 | 8/2004 | Giron | |
| 2006/0028730 A1 | 2/2006 | V Varaprasad et al. | |
| 2009/0057137 A1 | 3/2009 | Pitts et al. | |

FOREIGN PATENT DOCUMENTS

| | | |
|---|---|---|
| EP | 0167372 A2 | 1/1986 |
| EP | 0174727 A1 | 3/1986 |
| EP | 0275662 A1 | 7/1988 |
| EP | 0331201 A1 | 9/1989 |
| EP | 0331462 A1 | 9/1989 |
| EP | 0363044 B1 | 9/1989 |
| EP | 0363045 B1 | 9/1989 |
| EP | 0373020 B1 | 11/1989 |
| EP | 0373020 A1 | 6/1990 |
| EP | 0386341 A1 | 9/1990 |
| EP | 0454240 A2 | 4/1991 |
| EP | 0461685 B1 | 4/1991 |
| EP | 0429210 A2 | 5/1991 |
| EP | 0448260 A2 | 9/1991 |
| EP | 0737883 A2 | 12/1991 |
| EP | 0470867 A2 | 2/1992 |
| EP | 0512601 B1 | 4/1992 |
| EP | 0602175 B1 | 9/1992 |
| EP | 0241217 B1 | 3/1993 |
| EP | 0676058 B1 | 12/1993 |
| EP | 0676059 B1 | 12/1993 |
| EP | 0590904 A1 | 4/1994 |
| EP | 0411029 B1 | 10/1994 |
| EP | 0752612 B1 | 7/1996 |
| EP | 0867752 A1 | 3/1997 |
| EP | 0917667 B1 | 8/1997 |
| EP | 0831360 A1 | 9/1997 |
| EP | 0855615 A2 | 1/1998 |
| EP | 0831360 B1 | 3/1998 |
| EP | 0960926 A1 | 5/1999 |
| EP | 0961156 A2 | 5/1999 |
| EP | 0961159 A2 | 5/1999 |
| EP | 1011040 A1 | 6/2000 |
| EP | 1202609 A2 | 10/2001 |
| EP | 1253461 A2 | 4/2002 |
| EP | 1394598 A1 | 3/2003 |
| EP | 1857859 A2 | 11/2007 |
| EP | 1011040 B1 | 6/2010 |
| GB | 2031756 A | 4/1980 |
| GB | 2033357 A | 5/1980 |
| GB | 2031756 B | 3/1983 |
| GB | 2150737 A | 7/1985 |
| GB | 2163146 A | 2/1986 |
| GB | 2163146 B | 6/1988 |
| GB | 2199848 A | 7/1988 |
| JP | 54-33745 A | 3/1979 |
| JP | 55-88028 A | 7/1980 |
| JP | S5614408 A | 2/1981 |
| JP | S5772263 A | 5/1982 |
| JP | S5794724 A | 6/1982 |
| JP | S5848028 A | 3/1983 |
| JP | S5868726 A | 4/1983 |
| JP | S5876816 A | 5/1983 |
| JP | S6063272 A | 4/1985 |
| JP | 2-155162 A | 6/1990 |
| JP | H02151839 A | 6/1990 |
| JP | 3-265822 A | 11/1991 |
| JP | H0676950 A | 3/1994 |
| JP | H06122973 A | 5/1994 |
| JP | H0738126 A | 2/1995 |
| JP | H0779003 A | 3/1995 |
| JP | H07106614 A | 4/1995 |
| JP | H08194230 A | 7/1996 |
| JP | H08254717 A | 10/1996 |
| JP | 8-334750 A | 12/1996 |
| JP | H09270563 A | 10/1997 |
| JP | 9-305313 A | 11/1997 |
| JP | H1030181 A | 2/1998 |
| JP | 63-231318 A | 9/1998 |
| JP | 2000002899 A | 1/2000 |
| JP | 2000109321 A | 4/2000 |
| JP | 2001332131 A | 11/2001 |
| KR | 1997-0011880 B1 | 7/1997 |
| KR | 1997-0050332 | 7/1997 |
| WO | 88/05170 A1 | 7/1988 |
| WO | 89/10578 A1 | 11/1989 |
| WO | 8910578 A1 | 11/1989 |
| WO | 89/12844 A1 | 12/1989 |
| WO | 91/02102 A1 | 2/1991 |
| WO | 91/02282 A1 | 2/1991 |
| WO | 93/14436 A1 | 7/1993 |
| WO | 9519588 A2 | 7/1995 |
| WO | 95/30495 A1 | 11/1995 |
| WO | 97/48645 A1 | 12/1997 |
| WO | 9745767 A1 | 12/1997 |
| WO | 98/57890 A1 | 12/1998 |
| WO | 99/03676 A1 | 1/1999 |
| WO | 99/65051 A2 | 12/1999 |
| WO | 00/17701 A2 | 3/2000 |
| WO | 00/71777 A1 | 11/2000 |
| WO | 03/014254 A1 | 2/2003 |
| WO | 2009029111 A1 | 3/2009 |

OTHER PUBLICATIONS

Granqvist, C.G. et al., "Recent Advances in Electrochromics for Smart Windows Applications," Solar Energy, Elsevier Science Ltd., vol. 63, No. 4, dated 1998, pp. 199-216.

Granqvist, C.G., "Transparent Conductive Electrodes for Electrochromic Devices: A Review," Applied Physics A, Springer-Verlag, vol. 57, dated 1993, pp. 19-24.

Granqvist, Claes G., "Transparent conductors as solar energy materials: A panoramic review," Solar Energy Materials & Solar Cells, Elsevier B.V., vol. 91, dated 2007, pp. 1529-1598.

Green, S.V. et al., "Electrochromism in sputter deposited nickel-containing tungsten oxide films," Solar Energy Materials & Solar Cells, Elsevier B.V, vol. 99, dated 2012, pp. 339 344.

Green, S.V. et al., "Structure and composition of sputter-deposited nickel-tungsten oxide films," Thin Solid Films, Elsevier B.V., vol. 519, dated 2011, pp. 2062-2066.

(56) References Cited

OTHER PUBLICATIONS

Guanghui, Fu et al., "The Migration of Alkali Ions From Glass Substrates Coated with Sol-Gel Barrier Films," Journal of Non-Crystalline Solids, Elsevier B.V., vol. 112, dated 1989, pp. 454-457.
Guittoum, A. et al., "Effect of thickness on the physical properties of ITO thin films," European Physical Journal Applied Physics, vol. 7, dated 1999, pp. 201-206.
Haacke, G. "Transparent Conducting Coatings," Annual Review of Materials Science, vol. 7, dated 1977, pp. 73-93.
Hamberg, I. et al., "Evaporated Sn-doped In2O3 films: Basic optical properties and applications to energy-efficient windows," J. Applied Physics, vol. 60, No. 10, Dec. 1, 1986, pp. R123-R159.
Hoheisel, M. et al., "Microstructure and Etching Properties of Sputtered Indium-Tin Oxide (ITO)," Physica Status Solidi(a), vol. 123, dated 1991, pp. 461-472.
Hu, Yalan et al., "Effects of heat treatment on properties of ITO films prepared by rf magnetron sputtering," Vacuum, Elsevier B.V., vol. 75, dated 2004, pp. 183-188.
Huang, Shiyong et al., "The Effects of Annealing on Characteristics of the ITO Films," Proceedings of SPIE—the International Society for Optical Engineering, vol. 2892, dated 1996, pp. 154-157.
Huang, Yin-Song et al., "Study on Raman spectra of electrochromic c-WO3 films and their infrared emittance modulation characteristics," Applied Surface Science, Elsevier B.V., vol. 202, dated 2002, pp. 104-109.
Infomnation Disclosure Statement for U.S. Appl. No. 10/495,758, filed Sep. 28, 2004, 15 pages.
Jeffery, F.R. et al., "Roll-to-Roll Fabrication of Amorphous Silicon Solar Modules on a Polymer Substrate," Society of Vacuum Coaters, 39th Annual Technical Conference Proceedings, 505/856-7188, dated 1996, pp. 344-347.
Joshi, R.N. et al., "Characteristics of indium tin oxide films deposited by r.f. magnetron sputtering," Thin Solid Films, Elsevier B.V., vol. 257, dated 1995, pp. 32-35.
Jun, Seung-Ik et al., "A statistical parameter study of indium tin oxide thin films deposited by radio-frequency sputtering," Thin Solid Films, Elsevier B.V., vol. 476, dated 2005, pp. 59-64.
Kamal, H. et al., "The electrochromic behavior of nickel oxide films sprayed at different preparative conditions," Thin Solid Films, Elsevier B.V, vol. 483, dated 2005, pp. 330-339.
Kamei, Masayuki et al., "Origin of characteristic grain-subgrain structure of tin-doped indium oxide films," Thin Solid Films, Elsevier B.V., vol. 259, dated 1995, pp. 38-45.
Kawade, Kiyoshi et al., "Thick Lithium Metal Target for Fast Neutron Production," Journal of Nuclear Science and Technology, vol. 10(8), dated Aug. 1973, pp. 507-510.
Keller, J.H. et al., "Electrical Properties of RF Sputtering Systems," IBM Journal of Research and Development, vol. 23, No. 1, dated Jan. 1979, 13 pages.
Kim, Seon-Soon et al., "Transparent conductive ITO thin films through the sol-gel process using metal salts," Thin Solid Films, Elsevier B.V., vol. 347, dated 1999, pp. 155-160.
Komar, Robert John "Measurement of the 3He( n, 1) Cross Section for En=0.14-2.0 MeV," thesis submitted to Dept. of Physics, Queen's University, Canada, dated Nov. 19, 1992, 133 pages.
Kulkarni, A.K. et al., "Dependence of the sheet resistance of indium-tin-oxide thin films on grain size and grain orientation determined from X-ray diffraction techniques," Thin Solid Films, Elsevier B.V., vol. 345, dated 1999, pp. 273-277.
Kulkarni, A.K. et al., "Electrical, optical and structural characteristics of indium-tin-oxide thin films deposited on glass and polymer subsli ales," Thin Solid Films, Elsevier B.V., No. 308-309, dated 1997, pp. 1-7.
Kulkarni, A.K. et al., "Electrical, optical, and structural properties of indium-tin-oxide thin films deposited on polyethylene terephthalate substrates by rf sputtering," Journal of Vacuum of Science & Technology A., vol. 16, No. 3., dated May-Jun. 1998, pp. 1636-1640.
Kuzmin, A. et al., "XAS, XRD, AFM and Raman studies of nickel tungstate electrochromic thin films," Electrochimica Acta, Elsevier B.V., vol. 46, dated 2001, pp. 2233-2236.
Lampert, C.M. et al., "Advanced Glazing Technology: Fenestration 2000 Project—Phase III: Glazing Materials," Advanced Glazing Materials Study, Univ. of California, dated Jun. 1992, 91 pages.
Lampert, C.M. et al., "Chemical and Optical Properties of Electrochromic Nickel Oxide Films," Solar Energy Materials, Elsevier B.V., vol. 14, dated 1986, pp. 161-174.
Lampert, C.M. et al., "Electrical and Optical Properties of Electrochromic Devices Utilizing Solid Polymer Electrolytes," Lawrence Berkeley Laboratory, Univ. of California, dated Sep. 1990, 31 pages.
Lampert, C.M., "Large-area smart glass and integrated photovoltaics," Solar Energy Materials & Solar Cells, Elseviei B.V., vol. 76, dated 2003, pp. 489-499.
Laszlo, J. et al., "Sputtering and reflection from lithium, gallium and indium," Journal of Nuclear Materials, Elsevier B.V., vol. 184, dated 1991, pp. 22-29.
Latz, R. et al., "Large-Scale Sputtering of ITO and SiO2 for High-Quality Display Applications," SID International Symposium Digest of Technical Papers, First Ed., dated May 1993, pp. 975-978.
Lawrence, David J. et al., "Fabrication of Electrochromic Devices in an Undergraduate Laboratory," Integrated Science and Technology Program and Center for Materials Science, dated 2001, pp. 86-90.
Lechner, R. et al., "All solid state electrochromic devices on glass and polymeric foils," Solar Energy Materials and Solar Cells, Elsevier B.V., vol. 54, dated 1998, pp. 139-146.
Lee, Se-Hee et al., "Characterization of Ni-W oxide thin film electrodes," Solid State Ionics, Elsevier B.V., vol. 109, dated 1998, pp. 303-310.
Lee, Se-Hee et al., "A New Lithium Based Counter Electrochromic Material for Fast Optical Response," Symposium on Electrochromic Materials, Electrochemical Society Proceedings vol. 96-24, dated 1997, pp. 191-205.
Lee, S.-H. et al., "New Transparent Li Ion Conducting Solid Electrolyte for All Solid State Electrochromic Devices," Proceedings of the Symposium on Electrochromic Materials II, vol. 94-2, dated 1994, pp. 290-303.
Lee, Se-Hee et al., "Raman spectroscopic studies of Ni-W oxide thin films," Solid State Ionics, Elsevier B.V., vol. 140, dated 2001, pp. 135-139.
Lewis, Brian G. et al., "Applications and Processing of Transparent Conducting Oxides," MRS Bulletin, dated Aug. 2000, pp. 22-27.
Lewis, B.G. et al., "Structure and Performance of ITO Sputtering Targets," Society of Vacuum Coaters, 37th Annual Technical Conference Proceedings, vol. 505/856-7188, dated 1994, pp. 432-439.
Trademark Electronic Search Systems (TESS), <http://tess2.uspto.gov/bin/showfield?f=doc&state=4810:k7lhih.2.18> URL accessed Jul. 23, 2013, 2 pages.
Libbey-Owens-Ford Glass Company Records, 1851-1991, MSS-066, The Ward M. Canaday Center for Special Collections, University of Toledo. Completed by Shirk et al. 1992, Weatherspoon 1998. 83 pages.
Skeddle, R.W., Libbey-Owens-Ford Co. correspondence dated Jul. 20, 1990, 1 page.
Trademark Electronic Search System (TESS), <http://tess2.uspto.gov/bin/showfield?f=doc&state=4810:k7lhih.8.34> URL accessed Jul. 23, 2013, 2 pages.
Trademark Electronic Search System (TESS), <http://tess2.uspto.gov/bin/showfield?f=doc&state=4810:k7lhih.8.37> URL accessed Jul. 23, 2013, 2 pages.
Libbey-Owens-Ford Co. "LOF High Performance TEC-Glass(TM)—Light Years Ahead," dated 1991, 1 page.
Libbey-Owens-Ford Co. Product Development, "New Residentail Glass Nets Energy Gains for Homeowners," Libbey-Owens-Ford Co.'s LOF Energy Advantage Low-E Glass, dated 2013, 2 pages.
Trademark Electronic Search System (TESS), "Word Mark = TEC", filing date Jul. 10, 1998 1 page.
Anderson, A.M. et al., "Towards an All-Solid-State Smart Window: Electrochromic Coatings and Polymer Ion Conductors," SPIE, vol. 1016, Optical Materials Technology for Energy Efficiency and Solar Energy Conversion VII, dated 1988, pp. 41-49.

(56) References Cited

OTHER PUBLICATIONS

Lampert, Carl M., "Advances in Optical Switching Technology for Smart Windows," Clean and Safe Energy Forever, vol. 3, ISES Solar World Congress, Sep. 4-8, 1989, pp. 2183-2192.

Gambke, Thomas et al., "Electrochromic Layers for Active Optical Filters," Glastech Ber., vol. 62, No. 2, dated 1989, pp. 38-45.

Annual Progress Report, "Variable Transmittance Electrochromic Windows for Passive Solar Application," ELC Laboratories, Inc., dated Nov. 1984, pp. 1-24.

Lagzdons, J.L. et al., "Modelling of the Solid State Electrochromic System WO3/HSbO3—2H20/Ni(OH)2," Physica Status Solidi (a), vol. 84, dated 1984, pp. K197-K200.

Gao, Wei et al., "Novel Electrochromic Projection and Writing Device Incorporating an Amorphous Silicon Carbide Photodiode," Journal of Non-Crystalline Solids, 266-269, dated 2000, pp. 1233-1237.

Pennisi, A. et al., "Preliminary Test of a Large Electrochromic Window," Electrochimica Acta, vol. 44, dated 1999, pp. 3237-3243.

Michalak, F. et al., "Electrochromic Lithium Nickel Oxide Thin Films by RF-Sputtering from A LiNiO2 Target," Electrochimica Acta, vol. 44, dated 1999, pp. 3085-3092.

Nagai, Junichi et al., "Durability of Electrochromic Glazing," Solar Energy Materials & Solar Cells, vol. 56, dated 1999, pp. 309-319.

Xuping, Zhang, "The Design and Preparation of Electrochromic Smart Windows," Acta Energiae Solaris Sinica, vol. 18, No. 4, dated Oct. 1997, 13 pages (Machine Translation Included).

Cui, Min-Hui et al., "All-Solid-State Complementary Electrochromic Windows Based on the Oxymethylene-Linked Polyoxyethylene Complexed with LiClO4," John Wiley & Sons, Inc , dated 1997, pp. 1739-1744.

Cantao, M.P. et al., "Inorganic Oxide Solid State Electrochromic Devices," Materials Science and Engineering, B26, dated 1994, pp. 157-161.

Passerini, Stefano et al., "Laminated Electrochromic Windows Based on Nickel Oxide, Tungsten Oxide, and Gel Electrolytes," Journal of Electrochemical Society, vol. 141, No. 4, Apr. 1994, pp. 1025-1028.

Kitao, M. et al., "Ta2O5 Electrolyte Films and Solid-State EC Cells," SPIE, vol. 1728, dated 1992, pp. 165-172.

Nagai, Junichi, "Recent Development in Electrochromic Glazings," SPIE, vol. 1728, dated 1992, pp. 194-199.

Bange, Klaus et al., "The Electrochromism of Single Tungsten Oxide and Nickel Oxide Films in Liquid Electrolyte Experiments and All-Solid-State Devices (ASSDs)," Proceedings of the Symposium on Electrochromic Materials, vol. 90-2, dated 1989, pp. 334-348.

Fujiwara, Ryoji et al., "Electrode Materials (Anode) in WO3 Thin Film Electrochromic Display Devices (ECD)," Imaging Science and Engineering Laboratory, Tokyo Institute of Technology, Yokohama, dated 1983, pp. 50-52.

Azens, A. et al., "Electrochromic Materials and Their Applications in Foil-Based Devices," Proceedings of SPIE, vol. 5123, dated 2003, pp. 185-195.

Azens, A. et al., "Electrochromic Smart Windows: Energy Efficiency and Device Aspects," Journal of Solid State Electrochemistry, vol. 7, dated 2003, pp. 64-68.

Garcia-Miquel, J.L. et al., "Nickel Oxide Sol-Gel Films From Nickel Diacetate For Electrochromic Applications," Thin Solid Films, vol. 424, dated 2003, pp. 165-170.

Kuzmin, A. et al., "Local Structure and Vibrational Dynamics in NiWO4," Ferroelectrics, vol. 258, dated 2001, pp. 21-30.

Azens, A. et al., "Electrochromic Devices Embodying W Oxide/Ni Oxide Tandem Films," Journal of Applied Physics, vol. 89, No. 12, Jun. 15, 2001, pp. 7885-7887.

Gomez, M. et al., "Improved Electrochromic Films of NiOx and WOxPy Obtained by Spray Pyrolysis," Solar Energy Materials & Solar Cells, vol. 64, dated 2000, pp. 297-309.

Karlsson, Joakim et al., "Angle-Resolved Optical Characterisation of an Electrochromic Device," Solar Energy, vol. 68, No. 6, dated 2000, pp. 493-497.

Trimble, Chris et al., "Infrared Emittance Modulation Devices Using Electrochromic Crystalline Tungsten Oxide, Polymer Conductor, and Nickel Oxide," Thin Solid Films 355-356, dated 1999, pp. 26-34.

Xuping, Zhang et al., "Investigation on Polyvinyl Chloride-Based Gel Electrolytes for an All-Solid-State Electrochromic System," Journal of Materials Science Letters, vol. 18, dated 1999, pp. 1745-1747.

Hale, Jeffrey S. et al., "Prospects for IR Emissivity Control Using Electrochromic Structures," Thin Solid Films, vol. 339, dated 1999, pp. 174-180.

Kitao, Michihiko et al., "Preparation of Solid Electrolyte Ta2O5 Films by Hydrogen-Introduced Sputtering and Application of Them to EC Cells," Shizuoka University Research Institute of Electronic Engineering Report, vol. 33, dated 1998, pp. 43-48.

Azens, A et al., "Sputter-Deposited Nickel Oxide for Electrochromic Applications," Solid State Ionics 113-115, dated 1998, pp. 449-456.

Wen, S.J. et al., "Analysis of Durability in Lithium Nickel Oxide Electrochromic Materials and Devices," Solar Energy Materials & Solar Cells, vol. 56, dated 1999, pp. 299-307.

Azens, A. et al., "Electrochromism in Oxide Films Based on Lanthanides," Solar Energy Materials & Solar Cells, vol. 56, dated 1999, pp. 193-203.

Ozer, Nilgun et al., "Electrochromic Characterization of Sol-Gel Deposited Coatings," Solar Energy Materials and Solar Cells, vol. 54, dated 1998, pp. 147-156.

Hutchins, M.G. et al., "The Electrochromic Behaviour of Tin-Nickel Oxide," Solar Energy Materials and Solar Cells, vol. 54, dated 1998, pp. 75-84.

Lee, Yoon-Kwan et al., "A Study on the Application of an ECD Device to Optical Shutter for DVD Player," Journal of the Korean Institute of Metals and Materials, vol. 36, No. 2, dated 1998, 15 pages (Machine Translation Included).

Hale, Jeffrey S. et al., "Visible and Infrared Optical Constants of Electrochromic Materials for Emissivity Modulation Applications," Thin Solid Films 313-314, dated 1998, pp. 205-209.

Chaudhuri, S. et al., "Surface Coatings for Solar Application," Materials Science Forum, vol. 246, dated 1997, pp. 181-206.

Vaivars, G. et al., "Aluminium Oxide—Poly(Vinyl Acetate) Composite Electrolyte for Electrochromic Devices," Ionics 3, dated 1997, pp. 310-312.

Hu, Xingfang et al., "An All-Solid-State Electrochromic Device with NiO/WO3 Complementary Structure," SPIE, vol. 3138, dated 1997, pp. 58-62.

Shen, Gong Lie et al., "All Inorganic Oxide Solid-State Thin-Film Electrochromic Devices With Variable Reflectance," SPIE, vol. 3138, dated 1997, pp. 49-57.

Friestad, Kenneth et al., "Transmission Spectra and Electrochemical Impedance Analysis of Polyaniline, Prussian Blue and Tungsten Oxide With Incorporated Nickel in Electrochromic Windows," Electrochemical Society Proceedings, vol. 96-24, dated 1997, pp. 353-368.

Yong, Ji et al., "The Optical Model of Electrochromic Layers," SPIE, vol. 2897, dated 1996, pp. 129-135.

Yong, Ji et al., "Research on Solid Electrochromic Mirror," SPIE, vol. 2897, dated 1996, pp. 123-128.

Xin, Xiankun et al., "NiO Coating for Smart Window Application by Reaction Flash Evaporation of Nickel," SPIE, vol. 2892, dated 1996, pp. 279-282.

Murphy, Thomas P. et al., "Oxidation States in Nickel Oxide Electrochromism," Solar Energy Materials and Solar Cells, vol. 39, dated 1995, pp. 377-389.

Brotherston, I.D. et al., "Counterelectrode Films for Electrochromic Windows," Solar Energy Materials and Solar Cells, vol. 39, dated 1995, pp. 257-270.

Lee, S.H. et al., "Electrochromic Behavior of Ni-W Oxide Electrodes," Solar Energy Materials and Solar Cells, vol. 39, dated 1995, pp. 155-166.

Anders, S. et al., "Formation of Metal Oxides by Cathodic Arc Deposition," Surface and Coatings Technology, vol. 76-77, dated 1995, pp. 167-173.

(56) References Cited

OTHER PUBLICATIONS

Arakaki, J. et al., "Electrochromism in NiOx and WOx Obtained by Spray Pyrolysis," Solar Energy Materials and Solar Cells, vol. 37, dated 1995, pp. 33-41.
Andrei, Maria et al., "Highly Conductive Solid Polymer Electrolyte for Smart Windows," Polymer, vol. 35, No. 17, dated 1994, pp. 3592-3597.
Adler, David et al., "Electrical and Optical Properties of Narrow-Band Materials," Physical Review B, vol. 2, No. 8, Oct. 15, 1970, pp. 3112-3134.
Akkad, F. El et al., "Effect of Substrate Temperature on the Structural, Electrical and Optical Properties of ITO Films Prepared by RF Magnetron Sputtering," Physica Status Solidi (a), vol. 177, dated 2000, pp. 445-452.
Alton, G.D., "High-Efficiency Target-Ion Sources for RIB Generation," IEEE, Particle Accelerator Conference, dated 1993, pp. 2979-2985.
Arai, Hajime et al., "Electrochemical and Thermal Behavior of LiNi1—zMzO2 (M=Co,Mn,Ti)," Journal of the Electrochemical Society, vol. 144, Issue 9, dated 1997, pp. 3117-3125.
Baeck, S.H. et al., "Combinatorial Electrochemical Synthesis and Characterization of Tungsten-Based Mixed-Metal Oxides," Journal of Combinatorial Chemistry, vol. 4, No. 6, dated 2002, pp. 563-568.
Bakke, Timothy O., "Glass Breakthroughs," Home Mechanix, dated Feb. 1991, pp. 55-57.
Bender, M. et al., "Dependence of Oxygen Flow on Optical and Electrical Properties of DC-Magnetron Sputtered ITO Films," Thin Solid Films, Elsevier Science S.A., vol. 326, dated 1998, pp. 72-77.
Benkhelifa, F. et al., "Near Room Temperature Deposited Indium Tin Oxide Films as Transparent Conductors and Counterelectrodes in Electrochromic Systems," Thin Solid Films, Elsevier Sequoia, vol. 232, dated 1993, pp. 83-86.
Berger, Robert et al., "A Laser-Programmable Multichip Module on Silicon," International Conference on Wafer Scale Integration, IEEE, dated 1993, pp. 30-35.
Defendant-Counterclaimant View Inc.'s Patent L.R. 3-3 Invalidity Contentions, *SAGE Electrochromics, Inc. v. View, Inc.*, United States District Court, Northern District of California, San Francisco Division, Civil Action No. 12-6441 (JST), dated Aug. 1, 2013, 1,295 pages.
Defendant-Counterclaimant View, Inc.'s First Amended Patent L.R. 3-3 Invalidity Contentions, *SAGE Electrochromics, Inc. vs. View, Inc.*, United States District Court for the Northern District of California, San Francisco Division, Civil Action No. 12-6441 (JST), dated Mar. 21, 2014, 588 pages.
Defendant-Counterclaimant View, Inc.'s Patent L.R. 3-3 Invalidity Contentions for the New SAGE Patents, United States District Court for the Northern District of California, San Francisco Division, Civil Action No. 12-6441 (JST), dated Jul. 25, 2014, 905 pages.
Declaration of Dr. David N. Ruzic Regarding U.S. Pat. No. 5,830,336, dated Nov. 6, 2014, 93 pages (Exhibit 1002 cited in U.S. Pat. No. 5,830,336 IPR).
Kawade, Kiyoshi et al., "Thick Lithium Metal Target for Fast Neutron Production," Journal of Nuclear Science and Technology, vol. 10, No. 8, Aug. 1973, 4 pages (Exhibit 1003 cited in U.S. Pat. No. 5,830,336 IPR).
Stein, R.P. et al., "Angular Distributions of Argon-Sputtered Lithium," Journal of Applied Physics, vol. 36, No. 4, Apr. 1965, 6 pages (Exhibit 1005 cited in U.S. Pat. No. 5,830,336 IPR).
Dzioba, Steven et al., "On The Kinetic Energies of Sputtered Excited Particles, I. Atoms Sputtered From Li, LiF, and NaCl," Radiation Effects, vol. 45, Nos. 3 and 4, copyright 1980, 12 pages (Exhibit 1006 cited in U.S. Pat. No. 5,830,336 IPR.).
Vossen, John L. et al., "Thin Film Processes," Academic Press, RCA Laboratories, David Sarnoff Research Center, Princeton, New Jersey, copyright 1978, 78 pages (Exhibit 1007 cited in U.S. Pat. No. 5,830,336 IPR).
Van Esdonk, J. et al., "Joining a Sputtering Target and a Backing Plate," Vacuum Technology, Technical Publishing Co., Jan. 1975, 3 pages (Exhibit 1011 cited in U.S. Pat. No. 5,830,336 IPR).
Nobes, M. et al., "An Improved Method for Producing Lithium Metal Targets," North-Holland Publishing Co., Nuclear Instruments and Methods, vol. 72, Apr. 1969, pp. 231-232 (Exhibit 1012 cited in U.S. Pat. No. 5,830,336 IPR).
Weisser, David C. et al., "Thin Lithium Targets Sealed in Nickel for Low Oxygen Contamination," The Review of Scientific Instruments, vol. 40, No. 5, May 1969, 6 pages (Exhibit 1013 cited in U.S. Pat. No. 5,830,336 IPR).
"Accelerator Targets Designed for the Production of Neutrons," Revised English Edition, European Atomic Energy Community—Euratom, Proceedings of the Meeting held at Liege (Belgium) on Feb. 17-18, 1964, 51 pages (Exhibit 1016 cited in U.S. Pat. No. 5,830,336 IPR).
Abramovich, S.N. et al., "Thin Lithium Metal Targets," Instruments and Experimental Techniques, vol. 25, No. 1, Part 2, copyright 1982, Plenum Publishing Corporation, 6 pages (Exhibit 1018 cited in U.S. Pat. No. 5,830,336 IPR).
Excerpts from the Prosecution History of U.S. Pat. No. 5,830,336, dated 1997, 17 pages (Exhibit 1020 cited in U.S. Pat. No. 5,830,336 IPR).
Invalidity Chart for U.S. Pat. No. 5,830,336 in view of Kawade et al. "Thick Lithium Metal Target for Fast Neutron Production," Exhibit C-1, Case No. 12-CV-6441 (JST)—*Sage Electrochromics, Inc. v. View, Inc.*, cited in IPR Nov. 6, 2014, 17 pages (Exhibit 1021 cited in U.S. Pat. No. 5,830,336 IPR).
Invalidity Chart for U.S. Pat. No. 5,830,336 in view of U.S. Pat. No. 5,230,459, Exhibit C-4, Case No. 12-CV-6441 (JST)—*Sage Electrochromics, Inc. v. View, Inc.*, cited in IPR Nov. 6, 2014,17 pages (Exhibit 1022 cited in U.S. Pat. No. 5,830,336 IPR).
Invalidity Chart for Lithium Sputtering Prior Art, Exhibit C-11, Case No. 12-CV-6441 (JST)—*Sage Electrochromics, Inc. V. View, Inc.*, cited in IPR Nov. 6, 2014, 6 pages (Exhibit 1023 cited in U.S. Pat. No. 5,830,336 IPR).
Petition for Inter Partes Review of U.S. Pat. No. 5,830,336 Challenging Claim 1 Under 35 U.S.C. 312 and 37 C.F.R. 42.104, Trial No. IPR2015-00244, filed Nov. 6, 2014, 67 pages (Cited in U.S. Pat. No. 5,830,336 IPR).
Petition for Inter Partes Review of U.S. Pat. No. 6,337,758 Challenging Claims 1,4, and 6 Under 35 U.S.C. 312 and 37 C.F.R. 42.104, Case IPR2015-00275, *View, Inc. v. Sage Electrochromics, Inc.*, filed Nov. 19, 2014, 66 pages (Cited in U.S. Pat. No. 6,337,758 IPR).
Declaration of Michael J. Cumbo, Ph D. regarding U.S. Pat. No. 6,337,758, dated Nov. 18, 2014, 73 pages (Exhibit 1002 cited in U.S. Pat. No. 6,337,758 IPR).
Invalidity Chart for U.S. Pat. No. 6,337,758 in View of U.S. Pat. No. 5,657,150, Exhibit A-3, Case No. 12-CV-6441 (JST)—*Sage Electrochromics, Inc. v. View, Inc.*, cited in IPR Nov. 19, 2014, 15 pages (Exhibit 1005 cited in U.S. Pat. No. 6,337,758 IPR).
Invalidity Chart for U.S. Pat. No. 6,337,758 in View of U.S. Pat. No. 6,094,292, Exhibit A-4, Case No. 12-CV-6441 (JST)—*Sage Electrochromics, Inc. v. View, Inc.*, cited in IPR Nov. 19, 2014, 14 pages (Exhibit 1006 cited in U.S. Pat. No. 6,337,758 IPR).
File History for U.S. Pat. No. 6,337,758, Preliminary Amendment, Case No. 12-CV-6441 (JST), *Sage Electrochromics, Inc. v. View, Inc.*, cited in IPR Nov. 19, 2014, 2 pages (Exhibit 1008 cited in U.S. Pat. No. 6,337,758 IPR).
File History for U.S. Pat. No. 6,337,758, Non-Final Office Action, dated Apr. 20, 2001, Case No. 12-CV-6441 (JST), *Sage Electrochromics, Inc. v. View, Inc.*, 8 pages (Exhibit 1009 cited in U.S. Pat. No. 6,337,758 IPR).
File History for U.S. Pat. No. 6,337,758, Amendment, filed Jul. 20, 2001, Case No. 12-CV-6441 (JST), *Sage Electrochromics, Inc. v. View, Inc.*, 16 pages (Exhibit 1010 cited in U.S. Pat. No. 6,337,758 IPR).
File History for U.S. Pat. No. 6,337,758, Notice of Allowability, dated Sep. 4, 2001, Case No. 12-CV-6441 (JST), *Sage Electrochromics, Inc. v. View, Inc.*, 2 pages (Exhibit 1011 cited in U.S. Pat. No. 6,337,758 IPR).

(56) References Cited

OTHER PUBLICATIONS

Excerpt from Random House Webster's College Dictionary, Second Edition, Random House, New York, Copyright 1999 by Random House, Inc., Case No. 12-CV-6441 (JST), *Sage Electrochromics, Inc.* v. *View, Inc.*, 4 pages (Exhibit 1013 cited in U.S. Pat. No. 6,337,758 IPR).

The American Heritage Dictionary, First Edition (1969), Second College Edition (1985), Third Edition (1992), Case No. 12-CV-6441 (JST), *Sage Electrochromics, Inc.* v. *View, Inc.*, 14 pages (Exhibit 1014 cited in U.S. Pat. No. 6,337,758 IPR).

Joint Claim Construction and Prehearing Statement in Accordance with Patent Local Rule 4-3, Case No. 12-CV-6441 (JST), *Sage Electrochromics, Inc.* v. *View, Inc.*, filed Oct. 3, 2013, 13 pages (Exhibit 1015 cited in U.S. Pat. No. 6,337,758 IPR).

File History for U.S. Pat. No. 6,337,758, Filed Application, filed Jun. 6, 2000, Case No. 12-CV-6441 (JST), *Sage Electrochromics, Inc.* v. *View, Inc.*, 28 pages (Exhibit 1016 cited in U.S. Pat. No. 6,337,758 IPR).

Petition for Inter Partes Review of U.S. Pat. No. 7,193,763 Under 35 U.S.C. 312 and 37 C.F.R. 42.104, Trial No. IPR2015-00245, filed Nov. 7, 2014, 67 pages (Cited in U.S. Pat. No. 7,193,763 IPR).

Declaration of Colin A. Wolden, Ph.D. regarding U.S. Pat. No. 7,196,763, dated Nov. 6, 2014, 102 pages (Exhibit 1002 cited in U.S. Pat. No. 7,196,763 IPR).

Kulkarni, A.K. et al., "Dependence of the Sheet Resistance of Indium-Tin-Oxide Thin Films on Grain Size and Grain Orientation Determined from X-Ray Diffraction Techniques," Thin Solid Films, vol. 345, No. 2, (1999), 9 pages (Exhibit 1005 cited in U.S. Pat. No. 7,196,763 IPR).

Kulkarni, A.K. et al., "Electrical, Optical, and Structural Properties of Indium-Tin-Oxide Thin Films Deposited on Polyethylene Terephthalate Substrates by RF Sputtering," Journal of Vacuum Science & Technology A, Second Series, vol. 16, No. 3, Part II, May/Jun. 1998, 18 pages (Exhibit 1006 cited in U.S. Pat. No. 7,196,763 IPR).

Morikawa, Hiroshi et al., "Crystallization and Decrease in Resistivity on Heat Treatment of Amorphous Indium Tin Oxide Thin Films Prepared by D.C. Magnetron Sputtering," Thin Solid Films, vol. 339, (1999), 5 pages (Exhibit 1008 cited in U.S. Pat. No. 7,196,763 IPR).

Choi, S.K. et al., "Effect of Film Density on Electrical Properties of Indium Tin Oxide Films Deposited by DC Magnetron Reactive Sputtering," Journal of Vacuum Science and Technology A, vol. 19, No. 5, Sep./Oct. 2001, 5 pages (Exhibit 1009 cited in U.S. Pat. No. 7,196,763 IPR).

Final Office Action for U.S. Appl. No. 10/495,758, dated Feb. 8, 2006, 9 pages (Exhibit 1011 cited in U.S. Pat. No. 7,196,763 IPR).

Chopra, K.L. et al., "Transparent Conductors—A Status Review," Thin Solid Films, vol. 102, (1983), Electronics and Optics, 46 pages (Exhibit 1012 cited in U.S. Pat. No. 7,196,763 IPR).

Response to Final Office Action for U.S. Appl. No. 10/495,758, dated Mar. 13, 2006, 18 pages (Exhibit 1013 cited in U.S. Pat. No. 7,196,763 IPR).

Joint Claim Construction and Prehearing Statement [N.D. Cal. Patent L.R. 4-3], Case No. C 12-06441 (JST), filed Sep. 24, 2014, 10 pages (Exhibit 1014 cited in U.S. Pat. No. 7,196,763 IPR).

Invalidity Chart for U.S. Pat. No. 7,196,763 in View of Japanese Tokkai Patent No. 63-213318, Exhibit B-2, Case No. 12-CV-6441 (JST)—*Sage Electrochromics, Inc.* v. *View, Inc.*, cited in IPR Nov. 7, 2014, 38 pages (Exhibit 1015 cited in U.S. Pat. No. 7,196,763 IPR).

Invalidity Chart for U.S. Pat. No. 7,193,763 in View of U.S. Pat. No. 5,919,571 to Badding et al., Exhibit B-1, Case No. 12-CV-6441 (JST)—*Sage Electrochromics, Inc.* v. *View, Inc.*, cited in IPR Nov. 7, 2014, 39 pages (Exhibit 1016 cited n U.S. Pat. No. 7,196,763 IPR).

Excerpt from Random House Webster's Unabridged Dictionary, Second Edition, Random House, New York, (2001), 3 pages (Exhibit 1017 cited in U.S. Pat. No. 7,196,763 IPR).

Thornton, John A. et al., "Transparent Conductive Sndoped Indium Oxide Coatings Deposited by Reactive Sputtering with a Post Cathode," Journal of Vacuum Science and Technology, vol. 13, No. 1, Jan./Feb. 1976, 3 pages (Exhibit 1018 cited in U.S. Pat. No. 7,196,763 IPR).

SAGE Electrochromics, Inc.'s Opening Claim Construction Brief, Case No. C 12-06441 (JST), United States District Court Northern District of California San Francisco Division, filed Nov. 21, 2013, 29 pages.

Defendant View, Inc.'s Responsive Claim Construction Brief, Case No. C 12-06441 (JST), United States District Court for The Northern District of California San Francisco Division, filed Dec. 9, 2013, 66 pages.

SAGE Electrochromics, Inc.'s Claim Construction Reply Brief, Case No. C 12-06441 (JST), United States District Court Northern District of California San Francisco Division, filed Dec. 19, 2013, 18 pages.

SAGE Electrochromics, Inc.'s Opening Claim Construction Brief, Case No. 12-cv-06441 JST, United States District Court Northern District of California San Francisco Division, filed Nov. 14, 2014, 29 pages.

Defendant-Counterclaimant View, Inc.'s Responsive Claim Construction Brief Regarding New SAGE Patents (Patent L.R. 4-5(a)), United States District Court for The Northern District of California San Francisco Division, filed Dec. 5, 2014, 73 pages.

SAGE Electrochromics, Inc.'s Claim Construction Reply Brief, Case No. 12-cv-06441 JST, United States District Court Northern District of California San Francisco Division, filed Dec. 12, 2014, 18 pages.

Van Dine, Julie, "A New Window on the World," SAGE Electrochromics, Inc., dated Mar. 11, 2005, pp. SAGE0343407-SAGE0343418.

Nagai, Junichi, "Characterization of Evaporated Nickel Oxide and its Application to Electrochromic Glazing," Solar Energy Materials and Solar Cells, vol. 31, dated 1993, pp. 291-299.

Passerini, S. et al., "Thin Metal Oxide Films on Transparent Substrates for Li-Insertion Devices," Journal of Applied Electrochrmistry, vol. 23, dated 1993, pp. 1187-1195.

Decker, F. et al., "A Comparison of the Electrochromic Behavior and the Mechanical Properties of WO3 and NiOx Thin Film Electrodes," Journal of the Electrochemical Society, vol. 138, No. 11, Nov. 1991, pp. 3182-3186.

Ottermann, C.R. et al., "Comparison of Tungsten and Nickel Oxide Electrochromism in Single Films and in All-Solid-State Devices," Thin Solid Films, vol. 193/194, dated 1990, pp. 409-417.

Bange, K. et al., "Investigation of Reflective Electrochromic All-Solid-State Devices by Nuclear Reaction Analysis (NRA)," SPIE, vol. 1272, Optical Materials Technology for Energy Efficiency and Solar Energy Conversion IX, dated 1990, pp. 122-128.

Ottemann, C. et al., "Correlation of Injected Charge to Optical Constants (n,k) of Electrochromic Films," SPIE, vol. 1272, Optical Materials Technology for Energy Efficiency and Solar Energy Conversion IX, dated 1990, pp. 111-121.

Wagner, W. et al., "Hydrogen Dynamics in Electrochromic Multilayer Systems Investigated by the 15N Technique," Nuclear Instruments and Methods in Physics Research, vol. B50, dated 1990, pp. 27-30.

Kuwabara, Katsumi et al., "Electrochromic Displays with Transition-Metal Oxide as Counterelectrode," Journal of Materials Science, vol. 22, dated 1987, pp. 4499-4503.

Svensson, J.S.E.M. et al., "No Visible Electrochromism in High-Quality E-Beam Evaporated In2O3:Sn Films," Applied Optics, vol. 24, No. 15, Aug. 1, 1985, pp. 2284-2285.

Ma, Y.P. et al., "Development of Laminated Nickel/Manganese Oxide and Nickel/Niobium Oxide Electrochromic Devices," SPIE, vol. 1536, Optical Materials Technology for Energy Efficiency and Solar Energy Conversion X, dated 1991, pp. 93-103.

Schlotter, Peter et al., "Investigation of Absorptive Electrochemical Systems for Display Applications," Applied Solid State Physics, vol. 84, Issue 301 of Research Report, The German Federal Ministry for Research and Technology, Dec. 1984, 73 pages (Machine Translation Included).

(56) References Cited

OTHER PUBLICATIONS

Lampert, Carl M., "Electrochromic Materials and Devices for Energy Efficient Windows," Solar Energy Materials, vol. 11, dated 1984, pp. 1-27.
Selkowitz, Stephen E., "Building Technologies Program 1995 Annual Report," Energy & Environment Division, Ernest Orlando Lawrence Berkeley National Laboratory, dated May 1996, 49 pages.
Ryan, Michael D. et al., "Dynamic Electrochemistry: Methodoloty and Application," Analytical Chemistry, vol. 66, No. 12, Jun. 15, 1994, pp. 360R-427R.
Bruneaux, J. et al., "Correlation Between Structural and Electrical Properties of Sprayed Tin Oxide Films With and Without Fluorine Doping," Thin Solid Films, Elsevier Sequoia, vol. 197, dated 1991, pp. 129-142.
Buchanan, M. et al., "Preparation of Conducting and Transparent Thin Films of Tin-Doped Indium Oxide by Magnetron Sputtering," Applied Physics Letters, AIP Publishing, vol. 37, No. 2, Jul. 15, 1980, pp. 213-215.
Butrymowicz, Daniel B. et al., "Diffusion in Copper and Copper Alloys Part III. Diffusion in Systems Involving Elements of the Groups IA, IIA, IIIB, IVB, VB, VIB, and VIIB," Journal of Physical and Chemical Reference Data, vol. 4, No. 1, dated 1975, pp. 177-249.
Chen, Wenqing et al., "Electrochromism of Vanadium Oxide Films Doped by Rare-Earth (Pr, Nd, Sm, Dy) Oxides," Journal of Electroanalytical Chemistry, Elsevier Science B.V., Fol. 559, dated 2003, pp. 83-86.
Choi, S.K. et al., "Effect of Film Density on Electrical Properties of Indium Tin Oxide Films Deposited by DC Magnetron Reactive Sputtering," Journal of Vacuum Science & Technology A, vol. 19, No. 5, dated Sep./Oct. 2001, pp. 2043-2047.
Chopra, K.L., et al., "Transparent Conductors—A Status Review," Thin Solid Films, Elsevier Sequoia, vol. 102, dated 1983, pp. 1-46.
Christie, D.J. et al., "Voltage Reversal: Multi-Level Arc Management for Magnetron Sputtering," Advanced Energy, copyright 2013, pp. 1-8.
Shi, Yong-Ji et al., "Electrochromic Writing and Display Device," Chinese Journal of Liquid Crystals and Displays (Translation), vol. 17, No. 3, Jun. 2002, pp. 205-208.
Coburn, J. W. et al., "Positive-Ion Bombardment of Substrates in RF Diode Glow Discharge Sputtering," Journal of Applied Physics, vol. 43, No. 12, Dec. 1972, pp. 4965-4971.
Cochrane, G. et al., "Optimization of the Electrical and Optical Properties of ITO Layers Deposited by Magnetron Sputtering," SPIE—The International Society for Optical Engineering, vol. 2017, dated 1993, pp. 68-74.
Cogan, Stuart F. et al., "Design and Optical Modulation of a—WO3/a—IrO2 Electrochromic Windows," Optical Materials Technology for Energy Efficiency and Solar Energy Conversion VI, SPIE—The International Society for Optical Engineering, vol. 823, dated 1987, pp. 106-112.
Cogan, Stuart F. et al., "Electrochemical Investigation of Electrochromism in Transparent Conductive Oxides," Applied Optics, vol. 24, No. 15, Aug. 1, 1985, pp. 2282-2283.
Cogan, Stuart F. et al., "Electrochromism in Nb—V and Cr—V Mixed-Oxides," Journal of the Electrochemical Society, vol. 140, No. 1, Jan. 1993, pp. 112-115.
Cogan, Stuart F. et al., "Electrochromism in Sputtered Vanadium Pentoxide," Optical Materials Technology for Energy Efficiency and Solar Energy Conversion VIII, SPIE—The International Society for Optical Engineering, vol. 1016, dated 1988, pp. 57-62.
Cogan, Stuart F. et al., "Infrared Properties of Electrochromic Materials," Optical Materials Technology for Energy Efficiency and Solar Energy Conversion VIII, SPIE, vol. 1149, dated 1989, 6 pages.
Cogan, Stuart F. et al., "Materials and Devices in Electrochromic Window Development," Optical Materials Technology for Energy Efficiency and Solar Energy Conversion IV, SPIE, vol. 562, dated 1985, 11 pages.
Cogan, Stuart F. et al., "Morphology and Electrochromic Properties of V2O5 Films," Proceedings of the Symposium on Electrochromic Materials, Proceedings vol. 90-2, dated 1990, pp. 99-115.
Cogan, Stuart F. et al., "Optical Properties of Electrochromic Vanadium Pentoxide," Journal of Applied Physics, American Institute of Physics, vol. 66, No. 3, Aug. 1, 1989, pp. 1333-1337.
Cogan, Stuart F. et al., "Optical Switching in 'Complementary' Electrochromic Windows," Materials and Optics for Solar Energy Conversion and Advanced Lighting Technology, SPIE, vol. 692, dated 1986, pp. 32-38.
Cogan, Stuart F. et al., "Variable Transmittance Coatings Using Electrochromic Lithium Chromate and Amorphous WO3 Thin Films," Journal of the Electrochemical Society, vol. 144, No. 3, Mar. 1997, pp. 956-960.
Coleman, J.P. et al., "Electrochromism of Nanoparticulate-Doped Metal Oxides: Optical and Material Properties," Displays, Elsevier B.V., vol. 20, dated 1999, pp. 145-154.
Colton, Richard J. et al., "Photochromism and Electrochromism in Amorphous Transition Metal Oxide Films," Accounts of Chemical Research, vol. 11, dated 1978, pp. 170-176.
Cronin, J.P. et al., "Electrochromic Glazing," Materials Research, vol. 2, No. 1, dated 1999, pp. 1-9.
Cronin, J.P. et al., "Microstructure and Properties of Sol-Gel Deposited WO3 Coatings for Large Area Electrochromic Windows," Solar Energy Materials and Solar Cells, Elsevier Science Publishers B.V., vol. 29, dated 1993, pp. 371-386.
Dannenberg, R. et al., "Microstructural Comparison of Ag Films Grown on Amorphous TiO2 and Polycrystalline ZnO," 44th Annual Technical Conference Proceedings, Society of Vacuum Coaters, Apr. 21, 26,2001, pp. 218-224.
Davis, Lynn, "Properties of Transparent Conducting Oxides Deposited at Room Temperature," Thin Solid Films, Elsevier Sequoia, vol. 236, dated 1993, pp. 1-5.
Deepa, M. et al., "Electrodeposited Tungsten Oxide Films: Annealing Effects on Structure and Electrochromic Performance," Thin Solid Films, Elsevier B.V., vol. 468, dated 2004, pp. 32-42.
Deng, W. et al., "Development of Conductive Transparent Indium Tin Oxide (ITO) Thin Films Deposited by Direct Current (DC) Magnetron Sputtering for Photon-STM Applications," Applied Physics A, Materials Science & Processing, vol. 72, No. 5,dated 2001, pp. 595-601.
"DOE's Ervin Briefed on Advanced Glazing Research and Industrial Partnerships," <http://windows.lbl.gov/fenrd/W96/ervin.html>, retrieved May 20, 2014, 1 page.
Dudney, N.J. et al., "Sputtering of Lithium Compounds for Preparation of Electrolyte Thin Films," Solid State Ionics, Elsevier Science Publishers B.V, vol. 53-56, dated 1992, pp. 655-661.
Ryan, Michael D. et al., "Dynamic Electrochemistry: Methodology and Application," Analytical Chemistry, American Chemical Society, vol. 64, No. 12, dated Jun. 15, 1992, pp. 79R-116R.
Dzioba, Steven et al., "On the kinetic energies of sputtered excited particles, I. Atoms sputtered from Li, LiF, and NaCl," Radiation Effects, Taylor & Francis Publishers, vol. 45, No. 3-4, dated 2006, pp. 235-245.
Ellis, Frank B. Jr. et al., "Chemical vapor deposition of silicon dioxide barrier layers for conductivity enhancement of tin oxide films," Journal of Materials Research, Materials Research Society, vol. 4, No. 4, dated Jul./Aug. 1989, pp. 863-872.
Fang, Guojia et al., "Fabrication and characterization of electrochromic nanocrystalline WO3/Si (111) thin films for Infrared emittance modulation applications," Journal of Physics D; Applied Physics, Institute of Physics Publishing, vol. 34, dated 2001, pp. 2260-2266.
Fenestration R&D, "Glazings for the 21st Century: Development and Characterization of Advanced Glazings,"Lawrence Berkeley National Laboratory, Fall/Winter 1997 Issue, 12 pages.
Lee, S., USPTO File History for U.S. Appl. No. 10/480,014, dated 1998-2005, 95 pages.
Fluit, J.M. et al., "Isotopic Fractionation of Lithium in Sputtering," Journal of Chemical Physics, AIP Publishing, vol. 35, dated 1961, pp. 1143-1144.

(56) References Cited

OTHER PUBLICATIONS

Burdis, Mark et al., "Focused R&D for Electrochromic Smart Windows: Significant Performance and Yield Enhancements, Continuing Application," SAGE Electrochramies, Inc., dated Nov. 30, 2002, 46 pages.
Foster, N.F., "The Deposition and Piezoelectric Characteristics of Sputtered Lithium Niobate Films," Journal of Applied Physics, AIP Publishing, vol. 40, dated 1969, pp. 420-421.
Gilbert, L.R. et al., "Applications of Vacuum Deposited Transparent Conductors in Switchable Windows," Society of Vacuum Coaters, 38th Annual Technical Conference Proceedings, vol. 505/856-7188, dated 1995, pp. 111-119.
Gilbert, L.R. et al., "Comparison of ITO Sputtering Process from Ceramic and Alloy Targets onto Room Temperature PET Substrates," Society of Vacuum Coaters, 36th Annual Technical Conference Proceedings, dated 1993, pp. 236-241.
Golden, S.J et al., "Characterization of I.T.O. Thin Film Electrodes in Li-Based Systems and Their Use in Electrochromic Windows," Materials Research Society Symposium Proceedings, Materials Research Society, vol. 293, dated 1993, pp. 395-400.
Golden, S.J. et al., "Thin-Film Tin-Doped Indium Oxide Counter-Electrode for Electrochromic Applications," Solid State Ionics, Elsevier B.V., vol. 28-30, dated 1987, pp. 1733-1737.
Goldner, Ronald B. et al., "Electrochromic materials for controlled radiant energy transfer in buildings," Optical Materials and Process Technology for Energy Efficiency and Solar Applications, Proceedings of SPIE, vol. 428, dated Aug. 1983, pp. 38-44.
Goldner, Ronald B. et al., "Electrochromic Materials for Controlled Radiant Energy Transfer in Buildings," Solar Energy Materials, Elsevier B.V., vol. 11, dated 1984, pp. 177-185.
Goldner, R.B. et al., "Completely Solid Lithiated Smart Windows," Solar Energy Materials, Elsevier B.V., vol. 19, dated 1989, pp. 17-26.
Graham, M.E. et al., "Pulsed-DC Reactive Sputtering—New Opportunities," 37th Annual Technical Conference Proceedings, Society of Vacuum Coaters, vol. 505/856-7188, dated May 1994, pp. 275-279.
Granqvist, C.G., "Electrochromic tungsten oxide films: Review of progress 1993-1998," Solar Energy Materials & Solar Cells, Elsevier B.V., vol. 60, dated 2000, pp. 201-262.
Liu, Jingyue et al., "Nanostructured metal oxides for printed electrochromic displays," Materials Science and Engineerings, Elsevier B.V., vol. A286, dated 2000, pp. 144-148.
Louro, C. et al., "Thermal Oxidation of Tungsten-Based Sputtered Coatings," Journal of the Electrochemical Society, Wisconsin Tech Search, vol. 144, dated 1997, pp. 259-266.
Ma, Qinghua et al., "Room-Temperature Sputter Deposition of Polycrystalline Indium-Tin Oxide," Electrochemical and Solid-State Letters, vol. 2, No. 10, dated 1999, pp. 542-543.
MacLeod, H.A., "Thin-Film Optical Filters, Second Edition," Macmillan Publishing Company, New York, Adam Hilger Ltd, Bristol, dated 1986, 76 pages.
Mathew, J. Gordon H. et al., "Comparison of Fabrication Processes for Thin-Film Monolithic Electrochromic Devices," Optical Interference Coatings, 1995 Technical Digest Series, vol. 17, dated Jun. 1995, 5 pages.
Mathew, J.G.H., et al., "Large Area Electrochromics for Architectural Applications," Proceedings of the Third Symposium on Electrochromic Materials, Proceedings vol. 96-24, dated 1997, pp. 311-324.
Mathew, J.G.H. et al., "Study of Vacuum Deposited, Thin Film Transmissive Electrochromic Devices," Society of Vacuum Coaters, 38th Annual Technical Conference Proceedings, vol. 505/856-7188, dated 1995, pp. 194-197.
McCurdy, Richard J. et al., "Applications of CVD Transparent Conducting Oxides Deposited on a Float Glass Manufacturing Line," Electrochemical Society Proceedings, vol. 97-25, dated 1997, pp. 463-470.
Meisel, Thomas et al., "Large scale electrochromic devices for smart windows and absorbers," Optical Materials Technology for Energy Efficiency and Solar Energy Conversion XL Chromogenics for Smart Windows, vol. 1728, dated 1992, pp. 200-210.
Middleton, R. et al., "A Close to Universal Negative Ion Source*," Nuclear Instruments and Methods, North-Holland Publishing Co., vol. 118, dated 1974, pp. 329-336.
Monk, P.M.S et al., "Electro-Deposition of Films of Electrochromic Tungsten Oxide Containing Additional Metal Oxides," Electrochimica Acta, J. of Int'l Soc of Electrochemistry, vol. 38, Nos. 7-13, dated 1993, pp. 1521-1526.
Monk, Paul M.S. et al., "Toward the tailoring of electrochromic bands of metal-oxide mixtures," Electrochimica Acta, Elsevier B.V., vol. 46, dated 2001, pp. 2091-2096.
Morgan, D.V. et al., "Annealing effects on opto-electronic properties of sputtered and thermally evaporated indium-tin-oxide films," Thin Solid Films, Elsevier B.V., vol. 312, dated 1998, pp. 268-272.
Morikawa, Hiroshi et al., "Crystallization and decrease in resistivity on heat treatment of amorphous indium tin oxide thin films prepared by d.c. magnetron sputtering," Thin Solid Films, Elsevier B.V., vol. 339, dated 1999, pp. 309-313.
Gale, Charles I., "NESA Windows: Service News," A Service Publication of Lockheed Aeronautical Systems Company-Georgia, vol. 15, No. 1, dated Jan.-Mar. 1988, 20 pages.
Nobes, M. "An Improved Method for Producing Lithium Metal Targets," Nuclear Instruments and Methods, North-Holland Pub. Co., vol. 72, dated 1969, pp. 231-232.
Optical Coating Laboratory, Inc., "Optical Coating Laboratory, Inc. Announces the Licensing of its Electrochromic Technology to AFG Industries, Inc ," The Free Library, accessed Jun. 9, 2014, 2 pages.
Ottermann, C. et al., "PVD materials for electrochromic all solid state devices (ASSDs)," Optical Materials Technology for Energy Efficiency and Solar Energy Conversion XI: Chromogenics for Smart Windows, Proceedings EUROPTO Series, vol. 1728, dated 1992, pp. 211-222.
Oyama, T. et al., "Low resistance indium tin oxide films on large scale glass substrate," Journal of Vacuum Science & Technology A, American Vacuum Society, vol. 10, No. 4, dated Jul./Aug. 1992, pp. 1682-1686.
Park, Ki Cheol et al., "The physical properties of Al-doped zinc oxide films prepared by RF magnetron sputtering," Thin Solid Films, Elsevier B.V., vol. 305, dated 1997, pp. 201-209.
Passerini, Stefano et al., "Characterization of Nonstoichiometric Nickel Oxide Thin-Film Electrodes," Journal of the Electrochemical Society, The Electrochemical Society, Inc., vol. 141, No. 4, dated Apr. 1994, pp. 889-895.
Passerini, S. et al., "An Electrochromic Window Based on LixWO3/(PEO)8LiClO4/NiO," Journal of the Electrochemical Society, The Electrochemical Society, Inc., vol. 136, No. 11, dated Nov. 1989, pp. 3394-3395.
Pilkington Annual Report, dated 1990, 5 pages.
Pilkington Annual Report, dated 1991, 2 pages.
Pilkington Annual Report, Chairman's Statement, dated 1989, 3 pages.
Pourqueras, I. et al., "Electrochromic behaviour of nickel oxide thin films deposited by thermal evaporation," Thin Solid Films, Elsevier B.V, vol. 398-399, dated 2001, pp. 41-44.
Campet, G. et al., "Highly Reversible Electrochemical Insertion of Lithium, Accompanied with a Marked Color Change, Occuring in Microcrystalline Lithium Nickel Oxide Films," Active and Passive Elec. Comp., Gordon and Breach Sci. Pub. S.A., vol. 14, dated 1992, pp. 219-224.
Rauh, R. David et al., "Counter Electrodes in Transmissive Electrochromic Light Modulators," Solid State Ionics, North-Holland Pub Co., vol. 18-30, dated 1988, pp. 1707-1714.
Rauh, R. David et al., "Design Model for Electrochromic Windows and Application to the WO3/IrO2 System," Journal of the Electrochemical Society, The Electrochemical Society, Inc., vol. 140, No. 2, dated Feb. 1993, pp. 378-386.
Rauh, R. David et al., "Electrochromic 'Smart' Windows," 25th Proceedings of the Intersociety Energy Conversion Engineerings, Wisconsin Tech Search, vol. 4, dated 1990, pp. 26-30.
Rauh, R. David, "Electrochromic windows: an overview," Electrochimica Acta, Wisconsin Tech Search, vol. 44, No. 18, dated 1999, pp. 3165-3176.

(56) References Cited

OTHER PUBLICATIONS

Rauh, R. David et al., "Materials for electrochromic windows," Optical Materials Technology for Energy Efficiency and Solar Energy Conversion III, Proceedings of SPIE (Int'l Soc. for Optical Eng.), vol. 502, dated 1984, pp. 38-45.

Ray, Swati et al., "Properties of tin doped indium oxide thin films prepared by magnetron sputtering," Journal of Applied Physics, American Institute of Physics, vol. 54, No. 6, dated Jun. 1983, pp. 3497-3501.

Weisser, David C. et al., "Thin Lithium Targets Sealed in Nickel for Low Oxygen Contamination," The Review of Scientific Instruments, American Institute of Physics, vol. 40, dated 1969, pp. 683-685.

Von Rottkay, K. et al., "Optical Indices of Pyrolytic Tin-Oxide Glass," Materials Research Society Symposium Proceedings LBNL Publications, vol. 426, dated 1996, 7 pages.

Von Rottkay, K. et al., "Optical Indices of Tin-Doped Indium Oxide and Tungsten Oxide Electrochromic Coatings," MRS Proceedings, Materials Research Society, vol. 403, dated 1995, 6 pages.

Rottmann, M. et al., "Variations in microstructure and composition of indium tin oxide films with the deposition technique," Journal of Materials Science, Chapman&Hall Inc., vol. 31, dated 1996, pp. 6495-6500.

Rowley, Natalie M. et al., "New electrochromic materials," Science Progress, vol. 85, No. 3, dated 2002, pp. 243-262.

Sapers, S.P. et al., "Monolithic Solid State Electrochromic Coatings for Window Applications," Soc. of Vacuum Coaters, 39th Annual Technical Conference Proceedings, vol. 505/856-7188, dated 1996, pp. 248-255.

Satkiewicz, F.G., "Population of Ion Clusters Sputtered from Metallic Elements with 10 keV Ar+," Secondary Ion Mass Spectrometry,Springer Verlag Berlin, dated 1986, pp. 63-65.

Sbar, N. et al., "Progress toward durable, cost effective electrochromic window glazings," Solar Energy Materials & Solar Cells, Elsevier B.V., vol. 56, dated 1999, pp. 321-341.

Scholl, R.A., "Advances in Arc Handling in Reactive and Other Difficult Processes," Society of Vacuum Coaters, 37th Annual Technical Conference Proceedings, vol. 505/856-7188, dated 1994, pp. 312-316.

Scholl, R.A., "A New Method of Handling Arcs and Reducing Particulates in DC Plasma Processing," Society of Vacuum Coaters, 36th Annual Technical Conference Proceedings, dated 1993, pp. 405-408.

Schuler, T. et al., "Optical, electrical and structural properties of sol gel ZnO:Al coatings," Thin Solid Films, Elsevier B.V., vol. 351, dated 1999, pp. 125-131.

Shigesato, Yuzo et al., "A microstructural study of low resistivity tin-doped indium oxide prepared by d.c. magnetron sputtering," Thin Solid Films, Elsevier B.V., vol. 238, dated 1994, pp. 44-50.

Shigesato, Yuzo et al., "Electrical and structural properties of low resistivity tin-doped indium oxide films," Journal of Applied Physics, American Institute of Physics, vol. 71, No. 7, dated Apr. 1992, pp. 3356-3364.

Shigesato, Yuzo et al., "ITO Thin-Film Transparent Conductors: Microstructure and Processing," JOM, Springer, vol. 47, Issue 3, dated Mar. 1995, pp. 47-50.

Shimanoe, K. et al., "Bismuth oxide thin film as new electrochromic material," Solid State Ionics, Elsevier B.V., vol. 113-115, dated 1998, pp. 415-419.

Shiyong, Huang et al., "All-solid-state Electrochromic Devices: Fabrication Process and Technology," Vacuum Science and Technology (China), vol. 21, No. 2, dated Mar. 2001, pp. 170-172. (Language: Chinese).

U.S. Department of Energy, "Electrochromic Glazings Deposited by High Rate Processes," USDE Small Business Innovation Research Phase II Application Cover Sheet, Appendix A, signed and dated May 20, 1994, 61 pages.

Answer, Affirmative Defenses, and Counterclaims of defendant—Counterclaimant View, Inc. filed Feb. 11, 2013, Case3:12-cv-06441-SI, 52 pages.

C. Pouillerie et al., "Effect of magnesium substitution on the cycling behavior of lithium nickel cobalt oxide", Journal of Power Sources, vol. 96, 2001, pp. 293-302, XP002682874.

Complaint for Patent Infringement and Injunctive Relief—*Sage Electrochromics, Inc.* vs *View Inc.*, Filed Dec. 20, 2012, Case No. C 12 6441.

Defendant-Counterclaimant View, Inc.'s Answer to Plaintiff and Counterclaim—Defendant *Sage Electrochromics, Inc.'s* Counterclaims, Case No. C-12-6441 (JST), Filed Apr. 15, 2013.

European Search Report for Application EP06003692 dated May 9, 2006.

First Amended Answer, Affirmative Defenses, and Counterclaims of Defendant-Counterclaimant View, Inc., filed Mar. 4, 2013, Case3:12-cv-06441-JST.

International Search Report for Application No. PCT/US2012/047569 dated Sep. 19, 2012.

J. Kim. K. Amine, "A comparative study on the substitution of divalent. trivalent and tetravalent metal ions in LiNi1—xMx02 (M= Cu2+. Al3+ and Ti4+)", Journal of Power Sources, vol. 104, 2002, pp. 33-39, XP002682875.

J.B. Wu et.al., "Analysis of AC electrical properties of (Li and Ti)-doped NiO", Materials Science and Engineering B, vol. 99, 2003, pp. 294-297. XP002682872.

Kaufman, H.R. et al., Sputtering, J. Vac. Sci. Techn. 21, 725 (1982).

Lee, S.-H. et al., "Electrochromic behavior of Ni—W oxide electrodes," Solar energy Materials and Solar Cells 39 (1995) 155-166.

Lee, Se-Hee et al., "A New Lithium Based Counter Electrochromic Material for Fast Optical Response," Electrochemical Society Proceedings vol. 96-24, pp. 191-205, San Antonio, TX (1996).

Lee, Se-Hee et al., "Characterization of Ni—W oxide thin film electrodes," Solid State Ionics 109 (1998) 303-310.

Lee, Se-Hee et al., "Electrochromic mechanism in a—W03—y thin films," Applied Physics Letters, American Institute of Physics (Jan. 11, 1999), pp. 242-244.

Lee, Se-Hee et al., "Raman spectroscopic studies of Ni—W oxide thin films," Solid State Ionics 140 (2001) 135-139.

Passerini et al., "The Intercalation of Lithium in Nickel Oxide and its Electrochromic Properties" Journal of the Electrochemical Society, Electrochemcical Society, Manchester, New Hampshire, US, vol. 137, No. 10, pp. 3297-3300, Oct. 1, 1990.

Plaintiff and Counterclaim—Defendant *Sage Electrochromics, Inc.'s* Answer to Defendant and Counterclaimant *View, Inc.'s* First Amended Counterclaims, Affirmative Defenses, and Counterclaims, Case No. C 12-06441 (JST), filed Mar. 21, 2013, 11 pages.

Scrosati, B., "1st International Meeting on Electrochromism (IME-1), Murano-Venice, Oct. 19-21, 1994", Solar Energy Materials and Solar Cells 39 (1995) 111-113.

Svegl F et al., "Electrochromic properties of lithiated Co-oxide (LixCo02) and Ni-oxide (LixNi02) thin films prepared by the sol-gel route". Solar Energy. Pergamon Press. Oxford. GB. vol. 68, No. 6, Jan. 1, 2000 (Jan. 1, 2000). pp. 523-540, XP004198077.

Yan Daong et al., "Microstructure and dielectric properties of LiTiNiO thin films", Key Engineering Materials, vol. 336-338, 2007, pp. 2635-2638, XP009162456.

Z. Lu. J.R. Dahn, "Understanding the anomalous capacity of Lilli [Nixli (1/3-2x/3)Mn(2/3-x/3]02 cells using in situ X-ray diffraction and electrochemical studies", Journal of the Electrochemical Society, vol. 149, 2002, pp. A815-A822, XP002682873.

Cogan, Stuart F. et al., "Solid State Electrochromic 'Smart' Windows: Final Report," EIC Laboratories, Inc., USDE, dated Aug. 3, 1993, 24 pages.

Song, Pung Keun et al., "Study on Crystallinity of Tin-Doped Indium Oxide Films Deposited by DC Magnetron Sputtering," Jpn. J. Appl. Phys., Publication Board of the Japanese Journal of Applied Physics, vol. 37, dated 1998, pp. 1870-1876.

Sproul, W.D. et al., "Reactive direct current magnetron sputtering of aluminum oxide coatings," Journal of Vacuum Science & Technology, AVS Science & Technology of Materials, Interfaces, and Processing, vol. 13, No. 3, dated 1995, pp. 1188-1191.

Sproul, William D., "Ion-assisted deposition in unbalanced-magnetron sputtering systems," Materials Science and Engineering, Elsevier B.V., vol. A163, dated 1993, pp. 187-192.

(56) References Cited

OTHER PUBLICATIONS

Statement of Considerations, Request by Optical Coating Laboratory, Inc., signed 1995-1996, 4 pages.
Steck, A.J. et al., "The effect of ambient atmosphere in the annealing of indium tin oxide films," Journal of Applied Physics, AIP Publishing, vol. 51, No. 7, dated Jul. 1980, pp. 3890-3895.
Stein, R.P. et al., "Angular Distributions of Argon-Sputtered Lithium," Journal of Applied Physics, vol. 36, No. 4, dated Apr. 1965, pp. 1504-1506.
Szczyrbowski, J. et al., "Reactive sputtering of highly insulating layers with twin-cathode and mid frequency power supply," SPIE, SPIE Publishing, vol. 1727, dated 1992, pp. 122-136.
Szyszka, B., "Properties of TCO-Films Prepared by Reactive Magnetron Sputtering," Society of Vacuum Coaters, 43rd Annual Technical Conference Proceedings, vol. 505/856-7188, dated Apr. 2000, pp. 187-192.
Takada, S. et al., "Optical waveguides of singlecrystal LiNbO3 film deposited by rf sputtering," Applied Physics Letters, AIP Publishing, vol. 24, No. 10, dated May 1974, pp. 490-492.
Terzini, E. et al., "Influences of Sputtering Power and Substrate Temperature on the Properties of RF Magnetron Sputtered Indium Tin Oxide Thin Films," Japanese Journal of Applied Physics, Publishing Board of the Japanese Journal of Applied Physics, vol. 38, dated 1999, pp. 3448-3452.
Vossen, John L. et al., "Thin Film Processes," RCA Laboratories, David Sarnoff Research Center, Academic Press, dated 1978, 218 pages.
Thornton, John A. et al., "Transparent conductive Sndoped indium oxide coatings deposited by reactive sputtering with a post cathode," Journal of Vacuum Science & Technology, AVS: Science & Technology of Materials, Interfaces, and Processing, vol. 13, No. 1, dated 1976, pp. 117-121.
Thornton, John A. "High Rate Sputtering Techniques," Thin Solid Films, Metallurgical and Protective Coatings, vol. 80, dated 1981, pp. 1-11.
U.S. Glass, edits, "Application of new technologies in the glass industry, Parts I and II" U.S. Glass, Metal and Glazing, dated Feb. and Mar. 1989, 10 pages.
Valyukh, I. et al., "Ellipsometrically determined optical properties of nickel-containing tungsten oxide thing films: Nanostructure inferred from effective medium theory," Journal of Applied Physics, American Institute of Physics, vol. 112, dated 2012, pp. 044308-1-044308-6.
Van Esdonk, J. et al., "Joining a sputtering target and a backing plate," Vacuum Technology, Technical Publishing Co., dated Jan. 1975, pp. 41-44.
Wada, Motoi et al., "Production of Negative Lithium Ions From the Surface Immersed in Magnetic-Field-Free Plasmas," Nuclear Instruments and Methods in Physics Research, Elsevier B.V., vol. B37/38, dated 1989, pp. 132-135.
Wang, Yanqin et al., "Photoelectrochemical properties of metal-ion-doped TiO2 nanocrystalline electrodes," Thin Solid Films, Elsevier B.V., vol. 349, dated 1999, pp. 120-125.
Wei, Qiang et al., "Direct patterning ITO transparent conductive coatings," Solar Energy Materials & Solar Cells, Elsevier B.V., vol. 68, dated 2001, pp. 383-390.
Wong, M.S. et al., "Modeling magnetic fields of magnetron sputtering systems," Surface and Coatings Technology, Elsevier Sequoia, vol. 49, dated 1991, pp. 121-126.
Wu, X. et al., "Electrical and Optical Properties of Transparent Conducting Cadmium Stannate and Zinc Stannate Thin Films prepared by RF Magnetron Sputtering," Society of Vacuum Coaters, 39th Annual Technical Conference Proceedings, vol. 505/856-7188, dated 1996, pp. 217-220.
Xingfang, Hu et al., "Nanostructure Control in the Preparation of Smart Window Materials," World Renewable Energy Congress VI, Elsevier Science Ltd , vol. WREC2000, dated 2000, pp. 189-194.
Xuping, Zhang et al., "An All-Solid-State Inorganic Electrochromic Display of WO3 and NiO Films with LiNbO3 Ion Conductor," IEEE Electron Device Letters, IEEE, vol. 21, No. 5, dated May 2000, pp. 215-217.
Yamanaka, Kazusuke, "Degradation caused by substrate glass in WO3 electrochromic devices," Journal of Applied Physics, American Institute of Physics, vol. 54, No. 2, dated Feb. 1983, pp. 1126-1132.
Yamanaka, Kazusuke, "Tungsten Trioxide/Liquid Electrolyte Electrochromic Devices with Amorphous Iron Tungstate Counter Electrodes—Response Characteristics and Cell Reliability," Japanese Journal of Applied Physics, Publishing Board of the Japanese Journal of Applied Physics, vol. 25, No. 7, dated Jul. 1986, pp. 1073-1077.
Yonghong, Ye. et al., "Electrochromism of titanium oxide thin films," Thin Solid Films, Elsevier B.V., vol. 298, dated 1997, pp. 197-199.
Yoshimura, R. et al., "Deposition of ZnO:Al Transparent Conductive Thin Films by DC Magnetron Sputtering," Society of Vacuum Coaters, 35th Annual Technical Conference Proceedings, vol. 505/298-7624, dated 1992, pp. 362-364.
Yu, Phillip C. et al., "Characterization of Indium Oxide for the Use as a Counter-Electrode in an Electrochromic Device," Materials Research Society Meetings, Boston, MA, dated Dec. 1990, pp. 19-24.
Yu, P.C. et al., "In-Situ Spectroscopic Studies of Electrochromic Hydrated Nickel Oxide Films," Solar Energy Materials, Elsevier B.V., vol. 19, dated 1989, pp. 1-16.
Zelazowska, Elzbieta et al., "Counter electrodes for WO3-based electrochromic coatings," Optica Applicata, vol. XXX, No. 4, dated 2000, pp. 663-670.
Zum Felde, U. et al., "Electrochromism of Highly Doped Nanocrystalline SnO2:Sb," Journal of Physical Chemistry B., American Chemical Society, vol. 104, dated 2000, pp. 9388-9395.
"Tinting on Demand with SageGlass," Environmental Building News, A Publication of BuildingGreen, Inc., Special Reprint, dated Jun. 2006, 2 pages.
Goldner, R.B. et al., "A Monolithic Thin Film Electrochromic Window," Presented at Solid State Ionics Conference, Oct. 1991, 18 pages.
SAGE Electrochromics, Inc., Sales & Marketing Update, dated Mar. 7, 2002, pp. SAGE0410782-SAGE0410790.
"Electronically Tintable Glass for Light Control and Energy Savings," Velux Roof Windows and Skylights, copyright 2004, 2 pages.
Kirtz, Bill, "Chameleon Windows Haven't Shown Their True Colors Yet," Glass Magazine, Oct. 2004, 5 pages.
Lampert, Carl M., "International Advances in Chromogenic Switching Technology," Star Science, SPIE, vol. 3138, dated 1997, pp. 206-216.
Kullman, L. et al., "Cerium-Containing Counter Electrodes For Transparent Electrochromic Devices," Department of Technology, Uppsala University, SPIE, vol. 2968, dated 1997, pp. 219-224.
Svegl, Franc et al., "Electrochromic Properties of Lithiated Co-Oxide (LixCoO2) and Ni-Oxide (LixNiO2) Thin Films Prepared By The Sol-Gel Route," Solar Energy, vol. 68, No. 6, dated 2000, pp. 523-540.
Kullman, L. et al., "Electrochromic Devices Incorporating Cr Oxide and Ni Oxide Films: A Comparison," Solar Energy, vol. 68, No. 6, dated 2000, pp. 517-522.
Kullman, Lisen, "Components of Smart Windows," Investigations of Electrochromic Films, Transparent Counter Electrodes and Sputtering Techniques, Comprehensive Summaries of Uppsala Dissertations from the Faculty of Science and Technology, dated 1999, 59 pages.
Ozer, Nilgun et al., "Sol-Gel Deposited Electrochromic Films for Electrochromic Smart Window Glass," Ernest Orlando Lawrence Berkeley National Laboratory, Environmental Energy Technologies Division, dated Aug. 1996, 10 pages.
Ozer, Nilgun et al., "Sol-Gel Deposited Electrochromic Coatings," Ernest Orlando Lawrence Berkeley National Laboratory, Energy and Environment Division, dated Jun. 1995, 12 pages.

(56) References Cited

OTHER PUBLICATIONS

Rubin, M. et al., "Optical Indices of Lithiated Electrochromic Oxides," Ernest Orlando Lawrence Berkeley National Laboratory, Energy and Environment Division, dated Sep. 1996, 10 pages.
Chigane, Masaya et al., "Enhanced Electrochromic Property of Nickel Hydroside Thin Films Prepared by Anodic Deposition," Solid-State Science and Techonology, Journal of the Electrochemical Society, vol. 141, No. 12, Dec. 1994, pp. 3439-3443.
Estrada, W., "Electrochromism in Transition Metal Oxides," Revista Peruana de Fisica, vol. IV, No. 1, dated 1993, pp. 47-62.
Shen, P.K. et al., "The Performance of Electrochromic Tungsten Trioxide Films Doped with Cobalt or Nickel," Journal of the Electrochemical Society, vol. 138, No. 9, Sep. 1991, pp. 2778-2783.
Joseph, James et al., "A Simple and Novel Method of Preparing Thin Surface Films of Electrochromic Ni(OH)2 NiOOH," Solar Energy Materials, vol. 23, dated 1991, pp. 1-5.
Fonseca, C.M.P. da et al., "Intercalation of Electrochromic Thin Films of Transition Metal Oxides," Universidade Estadual de Campinas, SP (Brazil). Inst. de Fisica, National Meeting on Condensed Matter Physics, dated 1991, p. 362 (English Abstract Included).

\* cited by examiner

ELECTROCHROMIC DEVICES AND METHODS

CROSS-REFERENCE TO RELATED APPLICATIONS

The present application is a continuation application of U.S. patent application Ser. No. 13/895,680, filed May 16, 2013, entitled "ELECTROCHROMIC DEVICES AND METHODS," by Mark Samuel Burdis et al., which is a continuation application of U.S. patent application Ser. No. 12/077,324, filed Mar. 19, 2008, entitled "ELECTROCHROMIC DEVICES AND METHODS," by Mark Samuel Burdis et al., now U.S. Pat. No. 9,581,875, which is a divisional application of U.S. patent application Ser. No. 11/359,664, filed Feb. 22, 2006, entitled "ELECTROCHROMIC DEVICES AND METHODS," by Mark Samuel Burdis et al., now U.S. Pat. No. 7,372,610, which claims priority to U.S. Provisional Patent Application No. 60/655,578, filed Feb. 23, 2005, entitled "ELECTROCHROMIC DEVICES AND METHODS," by Mark Samuel Burdis et al., all of which are assigned to the current assignee hereof and incorporated herein by reference in their entireties.

BACKGROUND OF THE INVENTION

This invention relates to electrochromic devices which can vary the transmission or reflectance of electromagnetic radiation by application of an electrical potential to the electrochromic device.

Certain materials, referred to as electrochromic materials, are known to change their optical properties in response to the application of an electrical potential. This property has been taken advantage of to produce electrochromic devices which can be controlled to transmit optical energy selectively.

A number of factors affect the operation of an electrochromic device. One limitation on how dark an electrochromic device can become is how much charge can be stored in the counter electrode layer. There have been many different approaches for producing a charge storage medium, but most attention has focused on a thin film deposited parallel to the electrochromic material layer, and separated by an ionically conductive layer.

To date, most counter electrode layers have been made using NiO, LiNiO, or doped variants thereof. One advantage of using NiO and LiNiO materials is that under careful preparation conditions, the counter electrode can be made so that it displays anodic electrochromism with good efficiency and a high bleached state transmission. Unfortunately, it has been difficult to intercalate lithium into NiO based materials as a result of the material's compact crystalline structure. As such, higher voltages must be applied to such materials to intercalate lithium, which leads to undesirable side reactions.

Other methods employ proton coloration based mechanisms utilizing counter electrode layers comprised of vanadium oxides and other mixtures containing vanadium. Although it may be relatively easy to manufacture a counter electrode layer capable of coloring anodically in an aqueous medium, it is difficult to produce a complete device capable of long-term stability. It is, therefore, more advantageous to use lithium intercalation based systems.

A typical material used for counter electrode applications with lithium is vanadium oxide, which is a material that forms crystal structures similar to those seen in tungsten oxide systems. The open crystalline lattice of vanadium oxide allows lithium intercalation more readily than in NiO based structures. However, the presence of vanadium ions leads to the generation of a strong yellow color. This yellow color is only slightly modulated by lithium intercalation, and shows a reasonable cathodic electrochromic effect throughout the majority of the visible region, thus limiting the maximum transmission that can be achieved using this material as a counter electrode layer. Attempts to reduce the degree of coloration by doping vandadium oxides with other components result in a reduced electrochromic efficiency by reduction of the charge capacity of the counter electrode layer. Such doping results in a device with a higher bleached state transmission at the cost of a higher colored state transmission.

The problems associated with current counter electrode practice can be summarized with reference to FIG. 1, which provides an illustration of coloration in an electrochromic device having a cathodic counter electrode layer. The overall dynamic range for such a device is given by the net optical density change upon transferring charge from the counter electrode to the electromatic material layer. Such a transfer of charge results in a loss of optical density from the counter electrode and a gain of optical density in the electrochromic material layer. Hence, the net change in optical density is given by the difference in electrochromic efficiency between the electrochromic material layer and the counter electrode. Condition 1 shows a lower overall level of charge and, thus, a lower initial bleached state as compared with Condition 2. On the other hand, Condition 2 shows the situation when the charge capacity is increased, such as by increasing the thickness of the counter electrode layer. As a result, there is an increase in the overall dynamic range along with a concomitant increase in the optical density seen in the bleached state. Therefore, while the total charge of a cathodic counter electrode layer may be increased to enhance the overall dynamic range of the device, the optical density of the counter electrode also increases resulting in a less transparent bleached state.

Devices employing anodic counter electrodes have been briefly discussed in the prior art. Some of these devices employ counter electrodes comprised of nickel oxides doped with tungsten or tantalum. However, the materials comprising such counter electrodes contain the metal oxide in an amorphous phase. As a result, such devices suffer from low coloration efficiencies and low conductivity.

In view of the above problems, there remains a need for improved electrochromic coatings, and in particular electrochromic coatings that comprise solid state, inorganic thin films, and metal oxide thin films. In addition, there remains a need for electrochromic coatings that incorporate complementary anodic and cathodic electrochromic ion insertion layers, whose counter ions are either protons or lithium ions. There also remains a need for improved methods for making complementary electrochromic layers to act as a counter electrode, having improved properties over existing practices. Further, there also remains a need for an electrochromic device with a suitably wide transmission range between fully colored and fully bleached states, with suitably fast coloration and bleaching rates, and with suitable longevity and durability for outdoor architectural applications.

SUMMARY OF THE INVENTION

In accordance with the present invention, these and other objects have now been realized by the discovery of an electrochromic device comprising an anodic complementary counter electrode comprised of a mixed tungsten-nickel oxide and lithium. As such, the electrochromic device of the present invention is comprised of five sequential layers including two conductive layers, an electrochromic layer, an ion conductor layer, and an anodic complementary counter electrode layer.

In accordance with one embodiment of the electrochromic device, the amount of nickel present in the mixed tungsten-nickel oxide ranges from about 15% to about 90% by weight of the mixed oxide. Preferably, the amount of nickel ranges from about 30% to about 70% by weight of the mixed oxide. Most preferably, the amount of nickel ranges from about 40% to about 60% by weight of the mixed oxide.

In accordance with another embodiment of the electrochromic device, the electrochromic layer is comprised of a metal oxide. In a preferred embodiment, the metal oxide is selected from tungsten oxide, molybdenum oxide, niobium oxide, titanium oxide, copper oxide, iridium oxide, chromium oxide, and manganese oxide. More particularly, the metal oxide is tungsten oxide. In other embodiments, the metal oxide may be doped with one or more metals.

In accordance with another embodiment of the electrochromic device, the conductive layers are comprised of a metal oxide. In a preferred embodiment, the metal oxides of the conductive layers are selected from indium oxide, tin oxide, zinc oxide, and systems based on silver which are well known in the glazing industry. In some embodiments, the metal oxide is doped with one or more metals. More particularly, the metal oxide is indium tin oxide. The electrochromic device of the present invention comprises two conductive layers. As such, each of the conductive layers may be comprised of the same materials or different materials.

In accordance with another embodiment of the electrochromic device, the ion conductor layer is comprised of a lithium-ion conducting layer. Preferably, the lithium-ion conductor layer is comprised of a material selected from the groups consisting of silicates, silicon oxides, and borates.

In accordance with another embodiment of the electrochromic device, the anodic complementary counter electrode has a substantially uniform thickness ranging from about 500 Angstroms to about 6500 Angstroms. Preferably, the thickness ranges from about 1500 Angstroms to about 2500 Angstroms.

In accordance with the present invention, a method has also been discovered for preparing an electrochromic device deposited on a substrate comprising the steps of depositing one of an electrochromic layer or a counter electrode layer comprised of a mixed tungsten-nickel oxide on a first conductive layer, thereby providing a first deposited electrode, depositing an ion-conductor layer on the first deposited electrode, depositing the other of the electrochromic layer or the counter electrode layer on the ion-conductor layer, thereby providing a second deposited electrode, depositing a second conductive layer on the second deposited electrode, and heating the electrochromic device, whereby the mixed tungsten-nickel oxide is reduced through deposition of lithium onto the counter electrode layer immediately following its deposition. In one embodiment, the amount of nickel in the mixed tungsten-nickel oxide ranges from about 15% to about 90% by weight of the mixed oxide. In another embodiment, the amount of nickel ranges from about 30% to about 70% by weight of the mixed oxide. In a preferred embodiment, the amount of nickel ranges from about 40% to about 60% by weight of the mixed oxide.

In accordance with another embodiment of the method of the present invention, lithium is deposited onto the counter electrode in an amount which provides a maximum transmission through the counter electrode. In another embodiment, the amount of lithium deposited onto the counter electrode will be in excess of the amount which provides a maximum transmission through the counter electrode. More particularly, the excess amount of lithium deposited ranges from about 10% to about 40% above the amount which provides a maximum transmission through the counter electrode.

In accordance with another embodiment of the method of the present invention, the electrochromic device is heated to a temperature ranging from about 280° C. to about 500° C. In a preferred embodiment, the electrochromic device is heated to a temperature ranging from about 355° C. to about 395° C.

In accordance with another embodiment of the method of the present invention, the anodic complementary counter electrode layer is deposited by means of physical vapor deposition. More particularly, the anodic complementary counter electrode layer is deposited by means of intermediate frequency reactive sputtering or DC reactive sputtering.

In accordance with another embodiment of the method of the present invention, lithium is deposited on the anodic complementary counter electrode by means of wet chemical methods or by means of physical vapor deposition. In particular, the lithium may be deposited by means of intermediate frequency reactive sputtering or DC sputtering.

Yet another aspect of the present invention is to provide a method of making a counter electrode layer for use in connection with an electrochromic device comprising the steps of depositing a film of a mixed tungsten-nickel oxide on a substrate, reducing the mixed tungsten-nickel oxide film by depositing lithium on the film, and heating the counter electrode layer.

Applicants have found that an electrochromic device utilizing an anodic counter electrode comprised of a mixed tungsten-nickel oxide provides a suitably wide transmission range between the fully colored and fully bleached states. Moreover, such a device has found to be capable of reversibly intercalating several tens of millicoulombs per square centimeter of charge in the form of ions and charge compensating electrons. Further, applicants have discovered that an anodic counter electrode comprised of a mixed tungsten-nickel oxide provides a complementary response upon insertion of charge. Finally, applicants have discovered that an electrochromic device employing such a mixed tungsten-nickel oxide has improved transmission in the lithiated counter electrode layer when such device is heated.

DETAILED DESCRIPTION

One object of the present invention is to provide an electrochromic device having an anodic complementary counter electrode which provides a high transmission in the fully intercalated state and is capable of long term stability suitable for use as a commercial product.

This and other objectives are realized by means of an electrochromic device utilizing an anodic complementary counter electrode comprised of a mixed tungsten-nickel oxide which is capable of reversibly intercalating several tens of millicoulombs of charge per square centimeter, in the form of lithium ions and charge compensating electrons, and that upon intercalation of such ions, results in a high transmission in the fully intercalated state.

Another objective of the present invention is to provide a method of preparing an anodic complementary counter electrode layer for use in connection with an electrochromic device comprising a mixed tungsten-nickel oxide.

Another objective of the present invention is to provide a method of preparing an electrochromic device comprising an anodic complementary counter electrode comprised of a mixed tungsten-nickel oxide.

The shortcomings of the prior art, particularly those associated with cathodic counter electrodes (i.e. having to choose between a wide dynamic range or a counter electrode having a high bleached state transmission), are overcome through the use of an anodic complementary counter electrode as described herein. The dynamic range of an electrochromic device employing such an anodic complementary counter electrode allows the device's dynamic range to be increased simply by increasing the amount of charge transferred, provided the amount of charge in the counter electrode is controlled well enough to maintain high transparency.

Figure 1:
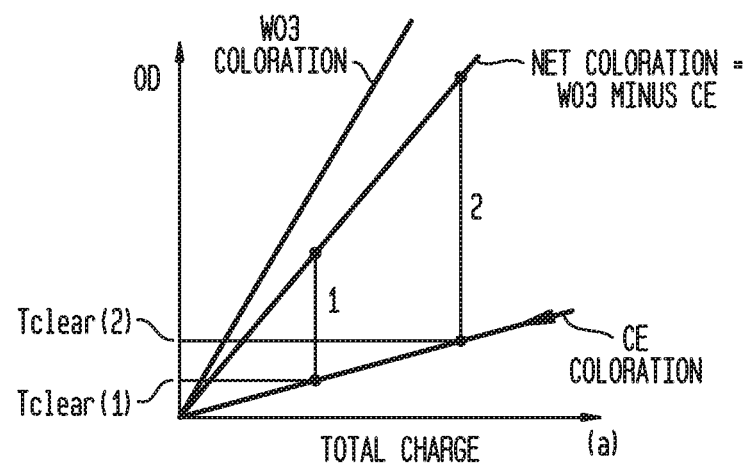
FIG. 1 is a graph detailing the coloration of an electrochromic device having a cathodic counter electrode layer.
Figure 2:
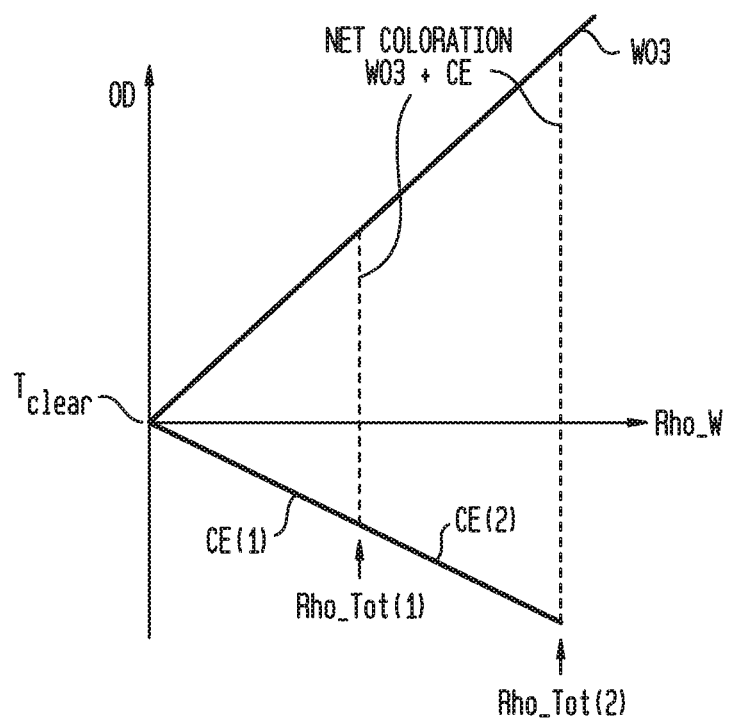
FIG. 2 is a graph detailing the coloration of an electrochromic device having an anodic counter electrode layer.

FIG. 2 illustrates the coloration of an electrochromic device utilizing an anodic complementary counter electrode layer having an increased dynamic range and a high initial bleached state in comparison to a cathodic counter electrode. Unlike in FIG. 1, the dynamic range in FIG. 2 is given by the sum of the electrochromic efficiencies of the counter electrode and the electrochromic material layers. The net result is that the dynamic range may be increased simply by increasing the amount of charge transferred to the anodic complementary counter electrode layer. Condition 1 and Condition 2 are different in that the anodic counter electrode in Condition 1 holds a lower amount of charge as compared with the anodic counter electrode in Condition 2. However, the lower amount of charge in Condition 1 as compared with Condition 2 does not lead to a compromise in the bleached state optical density. Increasing the thickness of the anodic counter electrode, as demonstrated by Condition 2, increases the overall dynamic range of the device without changing the initial bleached state optical density.

Prior to describing the invention further, some definitions will be helpful.

As used herein, the term "bleached state" means the state of an electrochromic material that is at least partially clear or at least partially non-colored.

As used herein, the term "intercalation" means the reversible insertion of a molecule, atom or ion into a crystal lattice.

As used herein, the term "lithium" means elemental lithium, its salts, oxides, coordination complexes, and chelates. "Lithium" may also refer to lithium ions.

As used herein, the term "sputtering" means a physical process whereby atoms in a solid target material are ejected into the gas plasma phase due to bombardment of the material by energetic ions. "Sputtering" will be discussed with regard to its use in film deposition.

Figure 3:
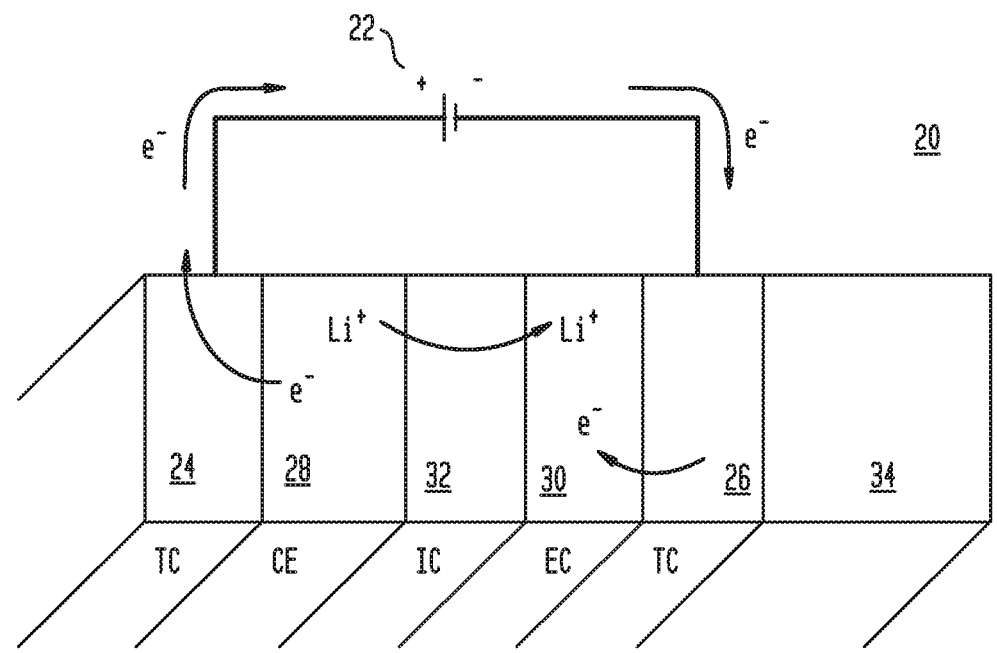
FIG. 3 is a schematic cross-section of a five layer electrochromic device in accordance with one embodiment of the current invention.

FIG. 3 shows a five layer electrochromic device in cross-section. In order for such a five-layer electrochromic device to function correctly, it is necessary to have at least the following sequential layers: an electrochromic layer ("EC") 30 which produces a change in absorption or reflection upon oxidation or reduction; an ion conductor layer ("IC") 32 which serves as an electrolyte, allowing the passage of ions while blocking electronic current; a counter electrode ("CE") 28 which serves as a storage layer for ions when the device is in the bleached state; and two conductive layers ("CL") 24 and 26 which serve to apply an electrical potential to the electrochromic device. Each of the aforementioned layers are applied sequentially on a substrate 34.

A low voltage electrical source 22 is connected to the device by means of conductive wires. In order to alter the optical properties of window 20, it is necessary that an electrical potential be applied across the layered structure. The polarity of the electrical source will govern the nature of the electrical potential created and, thus, the direction of ion and electron flow. In the embodiment depicted in FIG. 3, the electrical potential created will cause ions to flow from the counter electrode layer 28 through the ion conductor layer 32 to the electrochromic layer 30, thereby causing the electrochromic layer 30 to transform to the colored state thereby causing the transparency of the window 20 to be reduced.

The materials employed for the conductive layers 24 and 26 are well known to those skilled in the art. Exemplary conductive layer materials include coatings of indium oxide, indium tin oxide, doped indium oxide, tin oxide, doped tin oxide, zinc oxide, doped zinc oxide, ruthenium oxide, doped ruthenium oxide and the like, as well as all thin metallic coatings that are substantially transparent, such as transition metals including gold, silver, aluminum, nickel alloy, and the like. It is also possible to employ multiple layer coatings, such as those available from Pilkington under the tradename of TEC-Glass®, or those available from PPG Industries under the tradenames SUNGATE® 300 and SUNGATE® 500. The conductive layers 24 and 26 may also be composite conductors prepared by placing highly conductive ceramic and metal wires or conductive layer patterns on one of the faces of the substrate and then overcoating this with transparent conductive materials such as indium tin oxide or doped tin oxides. The conductive layers may be further treated with appropriate anti-reflective or protective oxide or nitride layers.

In some embodiments, the material selected for use in conductive layer 26 is the same as the material selected for use in conductive layer 24. In other embodiments, the material selected for use in conductive layer 26 is different than the material selected for use in conductive layer 24.

Preferably, the conductive layers utilized in the present invention are transparent layers of indium tin oxide. Typically, the conductive layer 26 is disposed on a substrate having suitable optical, electrical, thermal, and mechanical properties such as, for example, glass, plastic or mirror materials, as a coating having a thickness in the range of about 5 nm to about 10,000 nm, and preferably about 10 nm to about 1,000 nm. However, any thickness of the conductive layer may be employed that provides adequate conductance for the electrochromic device and which does not appreciably interfere with the transmission of light where required. Moreover, conductive layer 24 is typically the final layer of the electrochromic device deposited on the counter electrode layer 28. Other passive layers used for improving optical properties, or providing moisture or scratch resistance may be deposited on top of the active layers. These conductive layers are connected to an electrical power source in a conventional manner.

The electrochromic layer 30 employed as part of the present invention is well known to those skilled in the art. The electrochromic layer may be comprised of materials including inorganic, organic blends and/or composites of inorganic and organic electrochemically active materials such that the EC layer is capable of receiving ions transferred from the CE layer 28. Exemplary inorganic metal oxide electrochemically active materials include $WO_3$, $V_2O_5$, $MoO_3$, $Nb_2O_5$, $TiO_2$, CuO, $Ni_2O_3$, $Ir_2O_3$, $Cr_2O_3$, $Co_2O_3$, $Mn_2O_3$, mixed oxides (e.g W—Mo oxide, W—V oxide) and the like. One skilled in the art would recognize that each of the aforementioned metal oxides may be appropriately doped with lithium, sodium, potassium, molybdenum, vanadium, titanium, and/or other suitable metals or compounds containing metals. In a preferred embodiment, the EC layer 30 is selected from $WO_3$ or doped $WO_3$.

The thickness of the EC layer 30 may vary depending on the electrochemically active material chosen. However, the EC layer 30 typically ranges from about 500 Angstroms to about 20,000 Angstroms in thickness, preferably from about 3400 Angstroms to about 4200 Angstroms.

Overlying the electrochromic layer 30 is an ion conductor layer 32. The ion conductor layer 32 employed as part of the present invention is comprised of a solid electrolyte capable of allowing ions to migrate through the layer. The ion conductor layer 32 must have a sufficient ionic transport property to allow ions, preferably lithium ions, to migrate through. Any material may be used for an ion conductor provided it allows for the passage of ions from the counter electrode layer 28 to the electrochromic layer 30. In some embodiments, the ion conductor layer comprises a silicate-based structure. In other embodiments, suitable ion conductors particularly adapted for lithium ion transmission include, but are not limited to, lithium silicate, lithium aluminum silicate, lithium aluminum borate, lithium borate, lithium zirconium silicate, lithium niobate, lithium borosilicate, lithium phosphosilicate, lithium nitride, lithium aluminum fluoride, and other such lithium-based ceramic materials, silicas, or silicon oxides. Other suitable ion-conducting materials can be used, such as silicon dioxide or tantalum oxide. Preferably, the ion conductive layer 32 has low or no electronic conductivity. The preferred ion conductor material is a lithium-silicon-oxide produced by either sputtering or a sol-gel process.

The thickness of the IC layer 32 may vary depending on the material. However, the IC layer 32 typically ranges from about 100 Angstroms to about 700 Angstroms in thickness, preferably from about 200 Angstroms to about 600 Angstroms in thickness, and most preferably from about 325 Angstroms to about 475 Angstroms in thickness.

The counter electrode layer 28 utilized in the electrochromic device of the present invention is an anodic complementary counter electrode. The counter electrode layer 28 is considered anodic because it is anodically electrochromic, meaning that it will become more transparent when reduced (i.e. when ions are intercalated), which is the opposite of more common electrochromic materials such as tungsten oxides. As a result of the counter electrode 28 being transparent in the charged state, the counter electrode may act as a complementary electrochromic layer, causing the electrochromic device to color both from oxidation of the counter electrode and reduction of the electrochromic layer 28. Thus, when charge (in the form of ions and electrons) is removed from the complementary counter electrode 28 of the present invention, the layer will turn from a transparent state to a colored state.

The complementary counter electrode layer 28 of the present invention is comprised of a mixed tungsten-nickel oxide capable of storing ions and then releasing these ions for transfer to the electrochromic layer 30 in response to an appropriate electrical potential. In one embodiment, the mixed oxide has the form of a $Ni_2O_3$ and $WO_3$ composite. In another embodiment, the amount of nickel present in the mixed tungsten-nickel oxide ranges from about 15% to about 90% by weight of said mixed tungsten-nickel oxide, preferably from about 30% to about 70% by weight of said tungsten-nickel oxide, and most preferably from about 40% to about 60% by weight of said tungsten-nickel oxide. When charge is removed from the mixed tungsten-nickel oxide, the CE layer 28 will turn from a transparent state to a brown colored state.

In some embodiments, the mixed tungsten-nickel oxide is present in an amorphous state. In other embodiments, the mixed tungsten-nickel oxide is present in a crystalline state. In yet other embodiments, the mixed tungsten-nickel oxide may be present in a mixed amorphous and crystalline state. However, in preferred embodiments, the mixed tungsten-nickel oxide is present substantially in crystalline form. Without wishing to be bound by any particular theory, in some preferred embodiments, separate domains of different crystalline metal oxides may be present as an admixture (i.e. an admixture of crystalline tungsten oxide and crystalline nickel oxide) Again, without wishing to be bound by any particular theory, in other preferred embodiments, separate domains of a crystalline metal oxide and an amorphous metal oxide may be present (e.g. an admixture of amorphous nickel oxide and crystalline tungsten oxide, or an admixture of amorphous tungsten oxide and crystalline nickel oxide).

The thickness of the complementary counter electrode layer 28 is variable depending on the application sought for the electrochromic device and the transmission range desired. As such, the thickness may range from about 500 Angstroms to about 6500 Angstroms. In one embodiment of the present invention, the thickness ranges from about 1500 Angstroms to about 2500 Angstroms, preferably ranging from about 1750 Angstroms to about 2050 Angstroms in thickness.

The complementary counter electrode layer 28 of the present invention is also comprised of li lithium. In one embodiment of the present invention, the lithium comprising the CE 28 is at least partially intercalated within the mixed tungsten-nickel oxide. In another embodiment, the lithium is present as a film at least partially coating the surface of the CE. The lithium present in the CE 28, either on the CE surface and/or intercalated within the mixed tungsten-nickel oxide, is capable of being reversibly transferred from the CE to the EC 30 when an electrical potential is applied.

Typically the substrate 34 of the electrochromic device is comprised of transparent glass or plastic such as, for example, acrylic, polystyrene, polycarbonate, allyl diglycol carbonate [CR39 available from PPG Industries, Pittsburgh, Pa.], SAN [styrene acrylonitrile copolymer], poly(4-methyl-1-pentene), polyester, polyamide, etc. It is preferable for the transparent substrate 34 to be either clear or tinted soda lime glass, preferably float glass. If plastic is employed, it is preferably abrasion protected and barrier protected using a hard coat of, for example, a silica/silicone anti-abrasion coating, a diamond-like protection coating or their like, such as is well known in the plastic glazing art. Generally, the substrates have a thickness in the range of about 0.01 mm to about 10 mm, and preferably in the range from about 0.1 mm to 5 mm. However, any substrate of any thickness which will provide a functioning electrochromic device may be employed.

It will be appreciated that the complementary counter electrode layer 28 and the electrochromic layer 30 may be reversed in the overall structure of FIG. 3. However, if the CE layer 28 and the EC layer 30 are reversed, the polarity of the applied potential must be adjusted to ensure that the correct polarity for the layers is maintained.

In a preferred embodiment of the invention, the completed device of FIG. 3 is subjected to a heat treatment process, carried out subsequent to the fabrication of the device. A device subjected to such treatment has improved conductivity, an increased conductive layer transparency, and an increased transmission of the lithiated CE layer. Moreover, when heated, the lithiated mixed tungsten-nickel oxide may transform into a composite of $Li_2WO_4$ and $Ni_2O_3$.

The electrochromic device described herein could be coupled with radiation sensors (e.g., visible and solar) and energy management systems to automatically control their transmission and reflection.

The electrochromic device of the present invention may be powered with solar cells, thermoelectric sources, wind generators, etc., to make them self-sustaining. These may be also coupled into charge storage devices such as batteries, re-chargeable batteries, capacitors or other means. The charge storage devices could be utilized as automatic backup power source when primary source of power is interrupted.

The electrochromic device of the present invention may also be used as filters in displays or monitors for reducing the ambient light intensity, e.g., sun glare, that is incident on the monitor or display surface. Thus, the device may be employed to enhance the image quality of displays and monitors, particularly in well lit conditions.

These electrochromic devices may also be used as displays having an advantageously wide viewing area with a high contrast because no polarizers are required as are in conventional liquid crystal displays.

The electrochromic device of the present invention may also be used as eyewear or sunglasses.

A method of preparing an electrochromic device employing an anodic complementary counter electrode is also provided. A first conductive layer 26 is deposited on substrate 34 by methods known in the art and in accordance with the desired properties of a conductor layer as previously mentioned.

An electrochromic layer 30 is then deposited on conductor layer 26 through wet chemical methods, chemical vapor deposition and/or physical vapor deposition (e.g. solgel, metallo-organic decomposition, laser ablation, evaporation, e-beam assisted evaporation, sputtering, intermediate frequency reactive sputtering, RF sputtering, magnetic sputtering, DC sputtering, PVD and CVD and the like). In preferred embodiments, the electrochromic layer 30 is deposited via intermediate frequency reactive sputtering or DC sputtering techniques. In one embodiment, the EC layer 30 is deposited on a heated first conductor layer 26.

The deposited electrochromic layer 30 may be comprised of metal oxides including titanium oxides, vanadium oxides, tungsten oxides, molybdenum oxides, or doped variants thereof. In a preferred embodiment, the electrochromic layer 30 deposited is comprised of $WO_3$. In some embodiments, the deposited $WO_3$ may contain a stoichiometric excess or deficiency of oxygen, depending on the deposition method and conditions chosen. In other embodiments, the $WO_3$ may be doped with an appropriate metal or metallic compound.

An ion conductor layer 32 is then deposited on EC layer 30 through wet chemical methods, chemical vapor deposition and/or physical vapor deposition (e.g. sol-gel, metallo-organic decomposition, laser ablation, evaporation, e-beam assisted evaporation, sputtering, intermediate frequency reactive sputtering, RF sputtering, magnetic sputtering, DC sputtering, PVD and CVD and the like). In a preferred embodiment, the ion conductor layer is deposited via a sol-gel method or reactive sputtering.

An anodic complementary counter electrode layer 28 comprised of a film of a mixed tungsten-nickel oxide is then deposited on the IC layer 32 through physical vapor deposition, intermediate frequency reactive sputtering, DC sputtering, or RF-magnetron sputtering. In one embodiment, tungsten chips are placed on a nickel target with the sputtering pressure set between 1 mTorr and 10 mTorr by introducing oxygen or argon into the chamber. In another embodiment, powdered tungsten-nickel metals or oxides are hot pressed or hot isostatically pressed (HIPed) and utilized as a sputtering target in an oxygen rich or argon rich atmosphere.

After the deposition of the mixed tungsten-nickel oxide film, the tungsten-nickel oxide film is reduced through the deposition of lithium. The deposition of the lithium is achieved through one of either wet chemical methods, sol-gel, chemical vapor deposition, physical vapor deposition, or reactive sputtering. In a preferred embodiment, the source of the lithium deposited on the tungsten-nickel oxide film is lithium metal deposited in vacuum using a non-reactive sputtering process.

In one embodiment, the amount of lithium deposited on the mixed tungsten-nickel oxide film is carefully controlled such that an amount of lithium is added that allows for the greatest transmission of light through the counter electrode layer 28, and hence the whole device.

Figure 4:
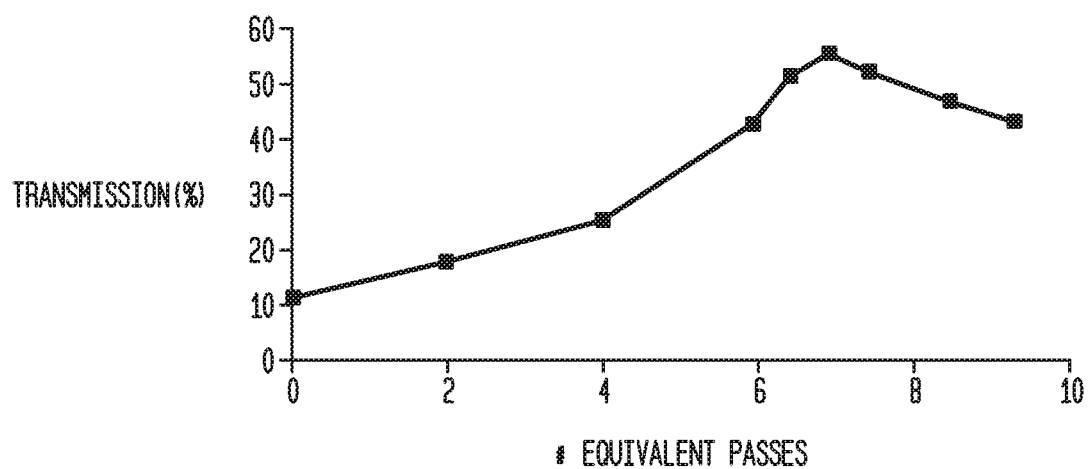
FIG. 4 is a graph detailing the transmission level of a partially completed electrochromic device during the deposition of lithium into the anodic counter electrode.

Typical results for the optical measurements of the electrochromic device are shown in FIG. 4, where the measured transmission is plotted as a function of the amount of intercalated lithium. The percent transmission, which is dominated by the absorption of the counter electrode, starts out low and increases as the charge, in the form of lithium ions, is intercalated. At higher levels of intercalated lithium, the transmission proceeds through a maximum and then begins to decrease when additional lithium is added beyond the maximum. The amount of charge necessary to obtain the maximum transmission of the device, measured in-situ, is utilized as a process control parameter to ensure the correct level of lithium is deposited, and ultimately intercalated onto or into the mixed tungsten-nickel oxide film.

It should also be noted that the starting transmission for the counter electrode depends on the thickness of the mixed tungsten-nickel oxide film and the absorption coefficient, which is dependent on the tungsten-nickel ratio and the oxidation state of the material. Moreover, it has been shown that a higher transmission is obtained for a more tungsten rich film and also for a more reduced film.

In another embodiment, the amount of lithium deposited onto the counter electrode layer 28 is in excess of the amount required to achieve the maximum transmission, such that the greatest transmission is still achieved as and when the excess lithium is lost during subsequent processing steps. If excess lithium is deposited, such amount of excess lithium ranges from about 10% to about 40% above that required to achieve the maximum transmission. The amount of excess lithium added, however, ultimately depends on the CE layer 28 thickness and the requirements for the electrochromic device's performance.

A second conductive layer 24 is deposited on the lithiated CE layer 28 by methods well known in the art and as described above in the deposition of the first conductive layer 26.

The device is completed by heating the entire electrochromic device in a vacuum, an inert atmosphere, or an atmospheric oven. It has been determined that in order to obtain a suitably uniform device after processing, there is a trade-off between the heating time and the size, e.g. larger windows require a longer time to heat up. It is also observed that the process can be achieved by heating at a lower temperature for a shorter time. In other words, there appears to be a requirement that the time-temperature product is approximately constant. Devices with sizes suitable for use in glazing products should be heated to a temperature ranging from about 280° C. to about 500° C., preferably to a temperature ranging from about 355° C. to about 395° C. The device may be heated for a time ranging from about 1 minute to about 120 minutes, preferably from about 10 minutes to about 30 minutes. Smaller devices, for other applications such as variable transmission filters for cameras and the like, can be heated much more rapidly, as the stringent requirements for uniformity are somewhat reduced.

In another embodiment, the device can be heated prior to the second conductive layers being deposited. This method results in electrochromic device properties substantially the same as those discussed in the preceding embodiment, but allows for the heating to be done in the same process chamber as the deposition, possibly resulting in improved process flow.

The heat treatment process has a positive effect on the switching characteristics of the electrochromic device, as well as improving the conductivity and transparency of the second conductive layer 26. The heat treatment also has the effect of increasing the transmission of the lithiated CE layer 28.

As already mentioned, the position of the complementary counter electrode layer 28 and the electrochromic layer 30 may be reversed in the overall structure presented in FIG. 3. One skilled in the art would appreciate that should the layers be reversed, the method of manufacturing the device does not change with regard to the steps that have to be performed to generate each layer. Regardless of the order of steps performed to form an electrochromic device employing the aforementioned complementary counter electrode, the device may still be subjected to the heat treatment process described herein.

One skilled in the art would appreciate that the methods utilized above to create a complementary counter electrode comprised of a mixed tungsten-nickel oxide may be used to develop a counter electrode for use in connection with any electrochromic device. That is, the methods used to develop the complementary counter electrode are not limited to use in the specific electrochromic device discussed herein. Moreover, the method of making the complementary counter electrode discussed above may also be used to deposit a complementary counter electrode on any surface, not merely ion conductor layers or other conductive layers.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed:

1. A heat treated electrochromic device comprising:
   a) a first electrode comprising one of a cathodic electrochromic layer or an anodic counter electrode layer,
   b) a second electrode comprising a other of said cathodic electrochromic layer or said anodic counter electrode layer, wherein the said anodic counter electrode layer comprises a mixed tungsten-nickel oxide and lithium;
   c) a lithium ion-conductor layer for conducting ions between said first and second electrodes, wherein said lithium ion-conducting layer comprises material selected from the group consisting of silicates, silicon oxides, and borates;
   d) a first conductive layer, and
   e) a second conductive layer, said first and second electrodes and said ion-conductor layer being sandwiched between said first and second conductive layers.

2. The heat treated electrochromic device of claim 1, wherein the amount of nickel in said mixed tungsten-nickel oxide ranges from 15% to 90% by weight of said mixed tungsten-nickel oxide.

3. The heat treated electrochromic device of claim 1, wherein the amount of nickel in said mixed tungsten-nickel oxide ranges from 30% to 70% by weight of said mixed tungsten-nickel oxide.

4. The heat treated electrochromic device of claim 1, wherein the amount of nickel in said mixed tungsten-nickel oxide ranges from 40% to 60% by weight of said mixed tungsten-nickel oxide.

5. The heat treated electrochromic device of claim 1, wherein said cathodic electrochromic layer comprises a metal oxide.

6. The heat treated electrochromic device of claim 1, wherein the anodic counter electrode layer comprises a composite of lithium tungsten oxide and nickel oxide.

7. A heat treated electrochromic device comprising:
   a) a first electrode comprising one of a cathodic electrochromic layer or an anodic counter electrode layer,
   b) a second electrode comprising a other of said cathodic electrochromic layer or said anodic counter electrode layer, wherein the anodic counter electrode layer comprising lithium and a mixed tungsten-nickel oxide;
   c) an ion-conductor layer for conducting ions between said first and second electrodes,
   d) a first conductive layer containing a first metal oxide; and
   e) a second conductive layer containing a second metal oxide, wherein said first and second metal oxides are different, and said first and second electrodes and said ion-conductor layer being sandwiched between said first and second conductive layers.

8. The heat treated electrochromic device of claim 7, wherein the anodic counter electrode layer comprising lithium and a mixed tungsten-nickel oxide.

9. The heat treated electrochromic device of claim 7, wherein the amount of nickel in said mixed tungsten-nickel oxide ranges from 15% to 90% by weight of said mixed tungsten-nickel oxide.

10. The heat treated electrochromic device of claim 7, wherein the amount of nickel in said mixed tungsten-nickel oxide ranges from 30% to 70% by weight of said mixed tungsten-nickel oxide.

11. The heat treated electrochromic device of claim 7, wherein the amount of nickel in said mixed tungsten-nickel oxide ranges from 40% to 60% by weight of said mixed tungsten-nickel oxide.

12. The heat treated electrochromic device of claim 7, wherein the anodic counter electrode layer comprises mixed domains of a crystalline metal oxide and an amorphous metal oxide.

13. A heat treated electrochromic device comprising:
a) a first electrode comprising one of a cathodic electrochromic layer or an anodic counter electrode layer,
b) a second electrode comprising a other of said cathodic electrochromic layer or said anodic counter electrode layer,
c) an ion-conductor layer for conducting ions between said first and second electrodes,
d) a first conductive layer; and
e) a second conductive layer, said first and second electrodes and said ion-conductor layer being sandwiched between said first and second conductive layers, said anodic counter electrode layer comprising lithium and a mixed tungsten-nickel oxide, and wherein the amount of nickel in said mixed tungsten-nickel oxide ranges from 15% to 90% by weight of said mixed tungsten-nickel oxide.

14. The heat treated electrochromic device of claim 13, wherein the amount of nickel in said mixed tungsten-nickel oxide ranges from 30% to 70% by weight of said mixed tungsten-nickel oxide.

15. The heat treated electrochromic device of claim 13, wherein the amount of nickel in said mixed tungsten-nickel oxide ranges from 40% to 60% by weight of said mixed tungsten-nickel oxide.

16. The heat treated electrochromic device of claim 13, wherein the anodic counter electrode layer comprises an amorphous metal oxide.

17. The heat treated electrochromic device of claim 13, wherein the anodic counter electrode layer comprises an admixture comprising crystalline tungsten oxide and crystalline nickel oxide.

18. The heat treated electrochromic device of claim 13, wherein the cathodic electrochromic layer is a metal oxide selected from the group consisting of tungsten oxide, vanadium oxide, molybdenum oxide, niobium oxide, titanium oxide, copper oxide, iridium oxide, chromium oxide, and manganese oxide.

* * * * *